(12) United States Patent
Yang

(10) Patent No.: US 10,887,138 B2
(45) Date of Patent: Jan. 5, 2021

(54) LOW DIGITAL INTERMEDIATE FREQUENCY (IF) IMAGE CANCELLING TRANSCEIVER

(71) Applicant: Samsung Electronics Co., Ltd., Gyeonggi-do (KR)

(72) Inventor: Sung Moon Michael Yang, Irvine, CA (US)

(73) Assignee: Samsung Electronics Co., Ltd

(*) Notice: Subject to any disclaimer, the term of this patent is extended or adjusted under 35 U.S.C. 154(b) by 0 days.

(21) Appl. No.: 16/701,628

(22) Filed: Dec. 3, 2019

(65) Prior Publication Data
US 2020/0177420 A1 Jun. 4, 2020

Related U.S. Application Data

(60) Provisional application No. 62/774,447, filed on Dec. 3, 2018.

(51) Int. Cl.
*H04L 27/12* (2006.01)
*H04L 27/148* (2006.01)

(52) U.S. Cl.
CPC .......... *H04L 27/122* (2013.01); *H04L 27/148* (2013.01)

(58) Field of Classification Search
CPC .................. H04L 27/122; H04L 27/148
See application file for complete search history.

(56) References Cited

U.S. PATENT DOCUMENTS

| 6,091,780 | A  | * | 7/2000 | Sointula | H04B 7/208 332/108 |
|---|---|---|---|---|---|
| 6,597,748 | B1 | * | 7/2003 | Hietala | H04B 1/30 375/324 |
| 8,121,213 | B2 | * | 2/2012 | Ota | H03D 1/24 375/270 |
| 8,130,632 | B2 | * | 3/2012 | Nanri | H04L 25/03828 370/210 |
| 2004/0056785 | A1 | * | 3/2004 | Webster | H03H 17/0664 341/61 |
| 2004/0240584 | A1 | * | 12/2004 | Meade | H03F 1/3241 375/297 |
| 2009/0325518 | A1 | * | 12/2009 | Mattisson | H04B 1/30 455/131 |
| 2010/0124257 | A1 | * | 5/2010 | Yahya | H04B 1/406 375/219 |
| 2010/0328127 | A1 | * | 12/2010 | Sampath | H04B 1/005 341/144 |
| 2011/0044380 | A1 | * | 2/2011 | Marra | H04B 1/0475 375/219 |
| 2013/0170581 | A1 | * | 7/2013 | Loh | H04L 25/03343 375/297 |
| 2014/0363159 | A1 | * | 12/2014 | Chien | H04B 10/548 398/43 |

(Continued)

*Primary Examiner* — Jaison Joseph
(74) *Attorney, Agent, or Firm* — The Farrell Law Firm, P.C.

(57) ABSTRACT

A method and system are herein provided. According to one embodiment, a method includes receiving, by a transceiver including a digital intermediate frequency (IF) modulator, an I baseband signal and a Q baseband signal, cancelling, by the digital IF modulator, an image in the I and Q baseband signals, and generating, by the digital IF modulator, a digital IF signal and a Hilbert transform of the digital IF signal.

18 Claims, 26 Drawing Sheets

(56) References Cited

U.S. PATENT DOCUMENTS

2016/0254897 A1* 9/2016 Berretta .................... H04L 5/02
375/267
2017/0214485 A1* 7/2017 Yu ........................ H04J 14/0298
2019/0036749 A1* 1/2019 Erez .................... H04L 27/2602

\* cited by examiner

LOW DIGITAL INTERMEDIATE FREQUENCY (IF) IMAGE CANCELLING TRANSCEIVER

PRIORITY

This application is based on and claims priority under 35 U.S.C. § 119(e) to a U.S. Provisional Patent Application filed on Dec. 3, 2018 in the United States Patent and Trademark Office and assigned Ser. No. 62/774,447, the entire contents of which are incorporated herein by reference.

FIELD

The present disclosure is generally related to signal processing. In particular, the present disclosure is related to a transceiver for low digital intermediate frequency (IF) image cancellation.

BACKGROUND

A transceiver includes a transmitter and a receiver. The transceiver is configured to transmit and receive digital signals. However, at the transmitter, the I and Q baseband signals may include an undesirable image that requires cancelling. At the receiver, the received digital signals may include an undesirable image that requires cancelling.

SUMMARY

According to one embodiment, a method includes receiving, by a transceiver including a digital IF modulator, an I baseband signal and a Q baseband signal, cancelling, by the digital IF modulator, an image in the I and Q baseband signals, and generating, by the digital IF modulator, a digital IF signal and a Hilbert transform of the digital IF signal.

According to one embodiment, an apparatus includes a transceiver including a digital IF modulator, a memory, and a processor configured to receive, by the transceiver, an I baseband signal and a Q baseband signal, cancel, by the digital IF modulator, an image in the I and Q baseband signals, and generate, by the digital IF modulator, a digital IF signal and a Hilbert transform of the digital IF signal.

According to one embodiment, a method includes receiving, by a transceiver including a digital IF demodulator, a digital IF signal and a Hilbert transform of the digital IF signal, cancelling, by the digital IF demodulator, an image in the a digital IF signal and a Hilbert transform of the digital IF signal, and generating, by the digital IF demodulator, an I baseband signal and a Q baseband signal.

According to one embodiment, an apparatus includes a transceiver including a digital IF modulator, a memory and a processor configured to receive, by a transceiver including a digital IF demodulator, a digital IF signal and a Hilbert transform of the digital IF signal, cancel, by the digital IF demodulator, an image in the a digital IF signal and a Hilbert transform of the digital IF signal, and generate, by the digital IF demodulator, an I baseband signal and a Q baseband signal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
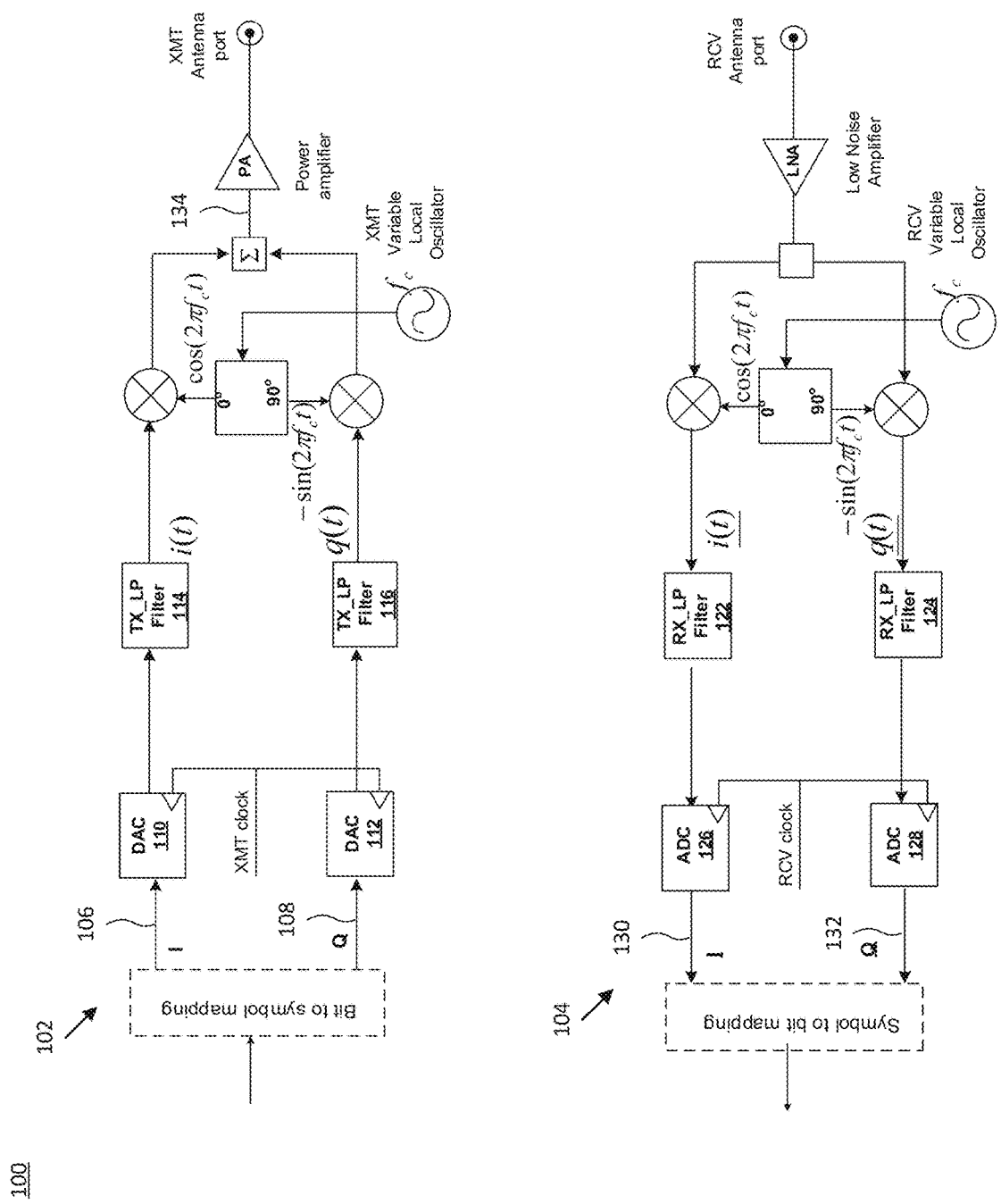
FIG. 1 illustrates a diagram of a transceiver.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 illustrates a diagram of a transceiver 100. The frequency of the local carrier (k) is variable for multiple channels. The transceiver 100 includes a transmitter 102 and a receiver 104. A baseband I signal 106 and a corresponding baseband Q signal 108, after processing by digital-to-analog converters (DACs) 110 and 112, as well as low pass filters (LPFs) 114 and 116, are up-converted directly to a carrier frequency in the transmitter 102. In the receiver 104, radio frequency (RF) signals are down converted after processing by LPFs 122 and 124, as well as analog-to-digital converters (ADCs) 126 and 128, to an I baseband signal 130 and a Q baseband signal 132 directly, meaning there is no IF translation.

In the transmitter 102, the signal at 134, after frequency translation and combining, is represented by Equation (1).

$$s_x(t)=i(t)\cos(2\pi f_c t)-q(t)\sin(2\pi f_c t) \quad (1)$$

In the receiver 104, the same signal will be demodulated down to the baseband to generate I and Q signals 130 and 132. Twice the carrier frequency should be eliminated by the LPFs 122 and 124.

In many wireless communications, RF is divided into channels and each user occupies a designated channel. For example, IEEE 802.11a standard uses a 5 GHz band with 20 MHz channels. In this multi-channel environment, a transmit signal should be band-limited enough so that it occupies only its own channel without spilling over to adjacent channels. In the receiver 104, a receiver should have a good channel selectivity so that the presence of neighboring signals do not interfere and degrade the reception. In this direct conversion transceiver 100, the channel selectivity, both transmit and receive, is mainly done by baseband filtering, shown as the TX_LPs and the RX_LPs 114, 116, 122 and 124 in FIG. 1. In practice, the filtering can be done digitally as well. This transceiver 100 is amenable to radio frequency integrated circuits (RFIC) implementation. However, there are issues of direct current (DC) offset and IQ amplitude and phase imbalance. In digital transmission, a signal part near DC is an important component to transfer correctly in order to avoid degradations including inter-symbol interference.

The use of an IF stage was a major innovation in broadcasting channels like amplitude modulation (AM), frequency modulation (FM), and television (TV). By adding a sharp IF filter (e.g., a surface acoustic wave (SAW) filter), the channel selectivity was improved considerably. Most radios used IF frequency (e.g., 70 MHz) when implementation was predominately done by analog discrete components. IQ imbalance problems were present but slightly easier since IF frequency is fixed. The flicker noise problem near DC is essentially gone. DC offset can be removed easily by DC blocking since it is not part of the signal.

Figure 2:
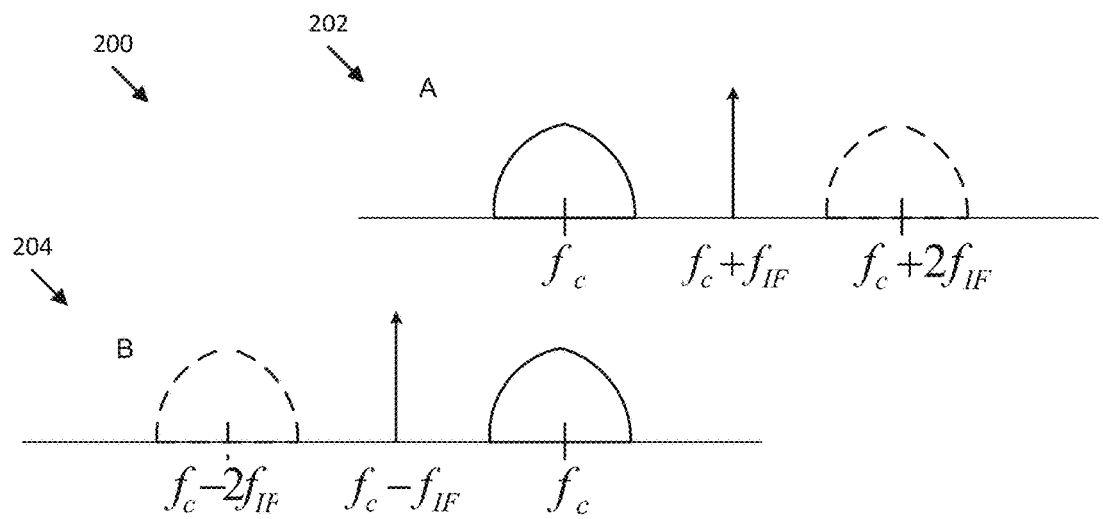
FIG. 2 illustrates a diagram of a spectrum in a heterodyne transceiver.

FIG. 2 illustrates a diagram of a spectrum 200 in a heterodyne transceiver. A heterodyne transceiver may require an image reject filter. The image may appear above a RF local oscillator (LO) frequency if it is $f_c+f_{IF}$ 202 or below a RF LO frequency if it is $f_c-f_{IF}$ 204. An image reject filter removes the image. Only one side band of an IF signal will be transmitted, i.e., and upper sideband with LO frequency $f_c-f_{IF}$ or a lower sideband with LO frequency $f_c-f_{IF}$. The image reject filter can be a lowpass or a highpass filter depending on which side band is rejected.

Figure 3:
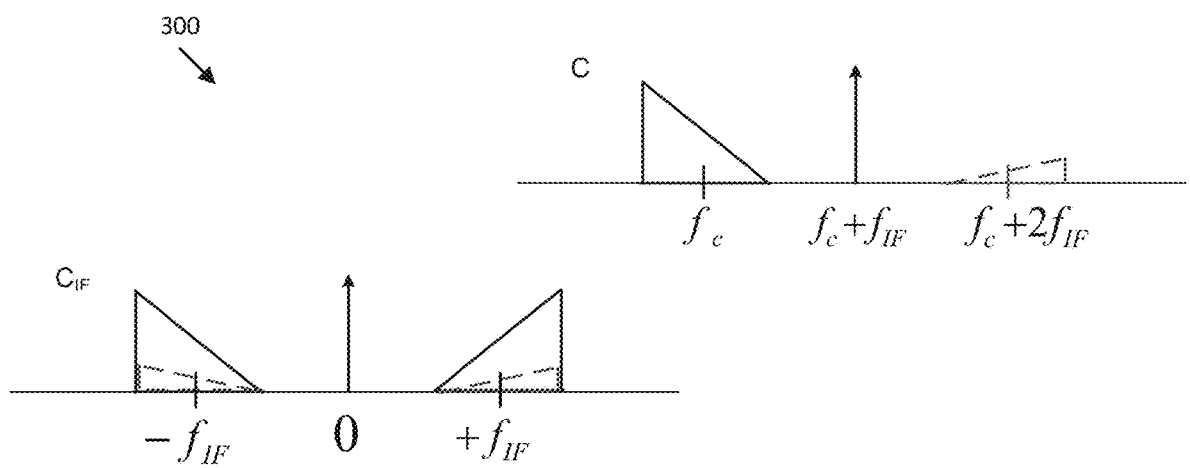
FIG. 3 illustrates a diagram of a spectrum in a heterodyne transceiver.

FIG. 3 illustrates a diagram of a spectrum 300 in a heterodyne transceiver. In the receiver, the image is not its own but could be other signals, and hence a signal at the image location can become interference. Thus, before down conversion, the image frequency should be cleaned by filtering or by image cancelling conversion. By selecting a sufficiently large IF, the rejection of an image is manageable. This is often implemented specially with analog systems. However, in complementary metal-oxide-semiconductor (CMOS) RF implementation, a sharp RF image filter is not desirable.

Figure 4:
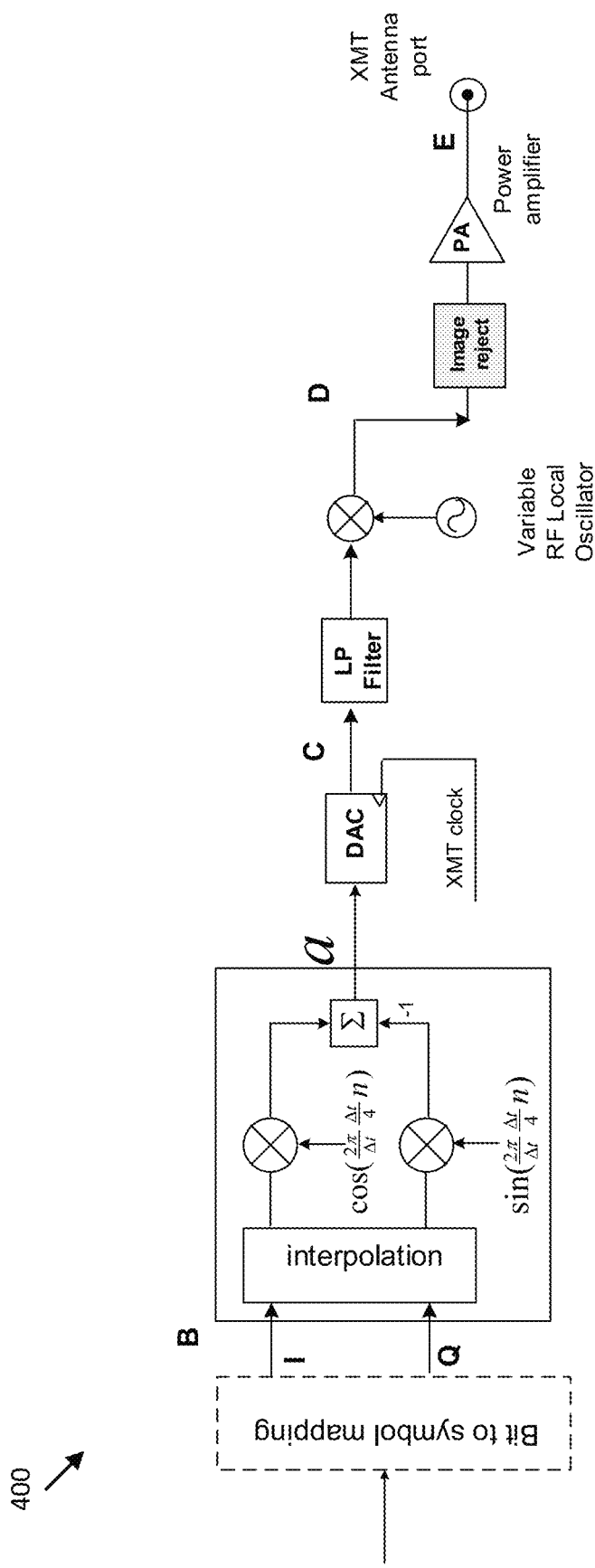
FIG. 4 illustrates a diagram of a transceiver with digital IF.

FIG. 4 illustrates a diagram of a transceiver 400 with digital IF. This architecture is simple but requires sharp image rejecting filters. In order to make them in one frequency, rather than frequency variable, an analog IF stage may be added. Implementing a sharp IF/RF filter inside chip may be challenging. Assuming it is available, the architecture is attractive, in addition to simplicity, IQ amplitude and phase imbalance problems are absent.

Figure 5:
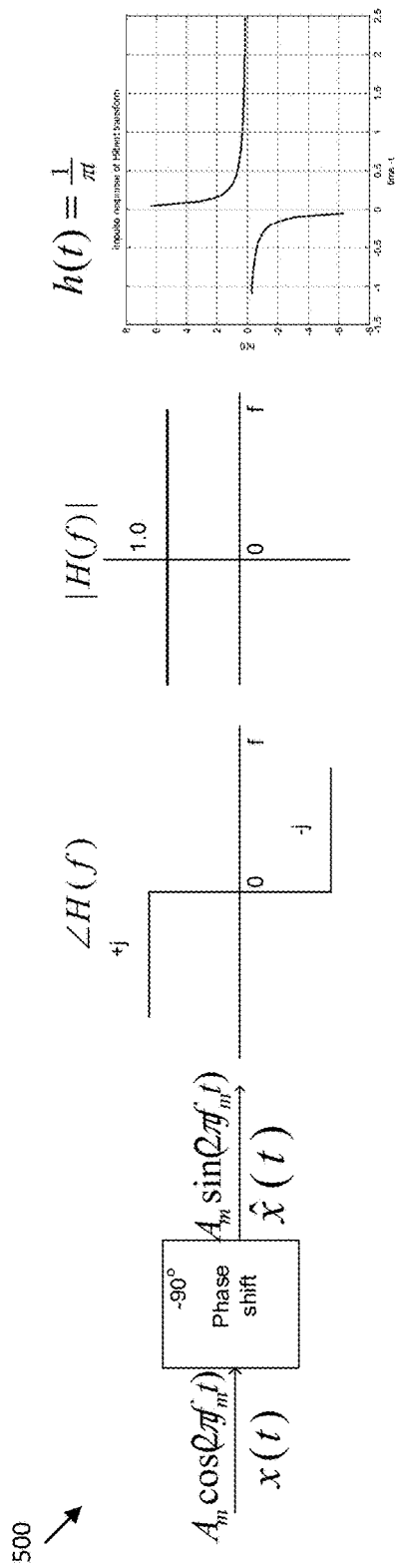
FIG. 5 illustrates a diagram of a Hilbert transform.

FIG. 5 illustrates a diagram of a Hilbert transform. Specifically, the block symbol, frequency response and impulse response of Hilbert transform is shown in FIG. 5. The Hilbert transform may be considered to be a 90° phase shift circuit block and is an essential component for image cancelling and for single sideband generations. −90° phase shift circuits and their frequency response or Hilbert transformer are shown in FIG. 5 ($\angle H(f)=-j\, sgn(f)$ and $|H(f)|=1.0$) and the impulse response is $$h(t) = \frac{1}{\pi \cdot t}.$$

Examples of the Hilbert transform are shown in Table 1.

TABLE 1

| x(t) | x̂(t) | x(t) | x̂(t) |
|---|---|---|---|
| cos(2πf t) | sin(2πf t) | $e^{j2\pi f_c t}$ | $-je^{j2\pi f_c t}$ |
| sin(2πf t) | −cos(2πf t) | $e^{-j2\pi f_c t}$ | $je^{-j2\pi f_c t}$ |

TABLE 1-continued

| x(t) | x̂(t) | x(t) | x̂(t) |
|---|---|---|---|
| m(t)cos(2πf t) | m(t)sin(2πf t) | δ(t) | $\frac{1}{\pi \cdot t}$ |
| m(t)sin(2πf t) | −m(t)cos(2πf t) | $\frac{\sin(t)}{t}$ | $\frac{1-\cos(t)}{t}$ |

Figure 6:
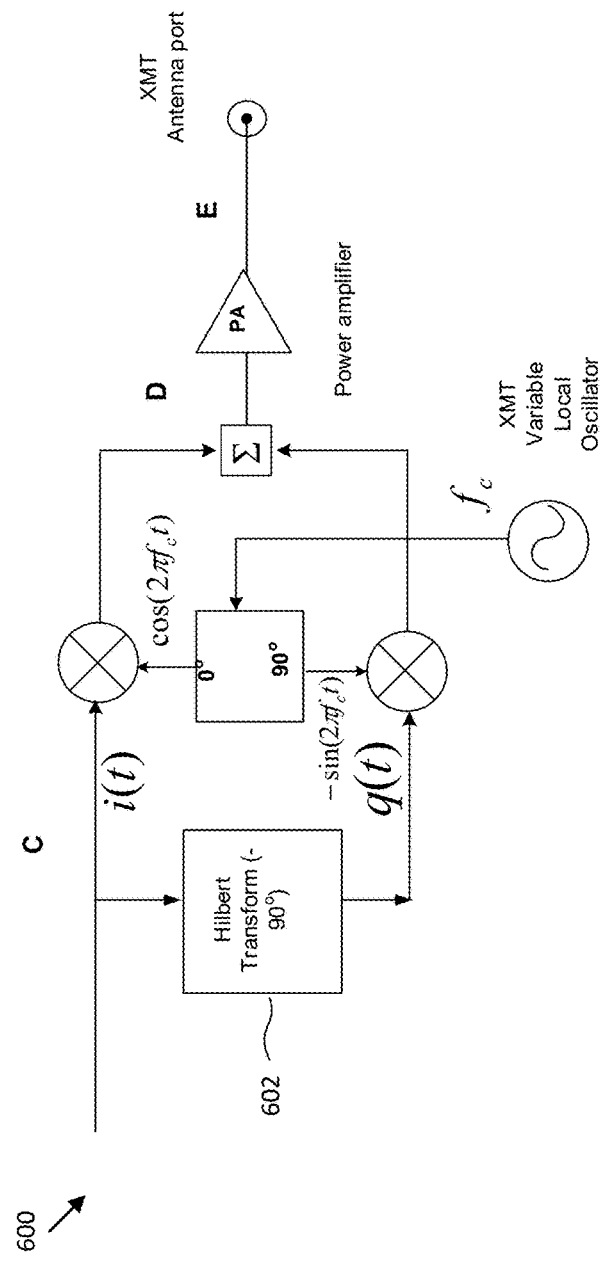
FIG. 6 illustrates a diagram of a single sideband (SSB) generator using a Hilbert transform with a quadrature modulator.

FIG. 6 illustrates a diagram of an SSB generator 600 using a Hilbert transform with a quadrature modulator. A quadrature modulated signal expressed in Equation (1), if q(t)=î(t) (i.e., Hilbert transform 602 of i(t)) is chosen, will generate single sideband (SSB) signals, and is given by Equation (2), for an upper side band.

$$s_x(t)=Re\{(i(t)+j\hat{i}(t))e^{j2\pi f_c t}\}=i(t)\cos(2\pi f_c t)-\hat{i}(t)\sin(2\pi f_c t) \quad (2)$$

This SSB generation mechanism is the same as an image-cancelling modulator (or sometimes called mixer).

Figure 7:
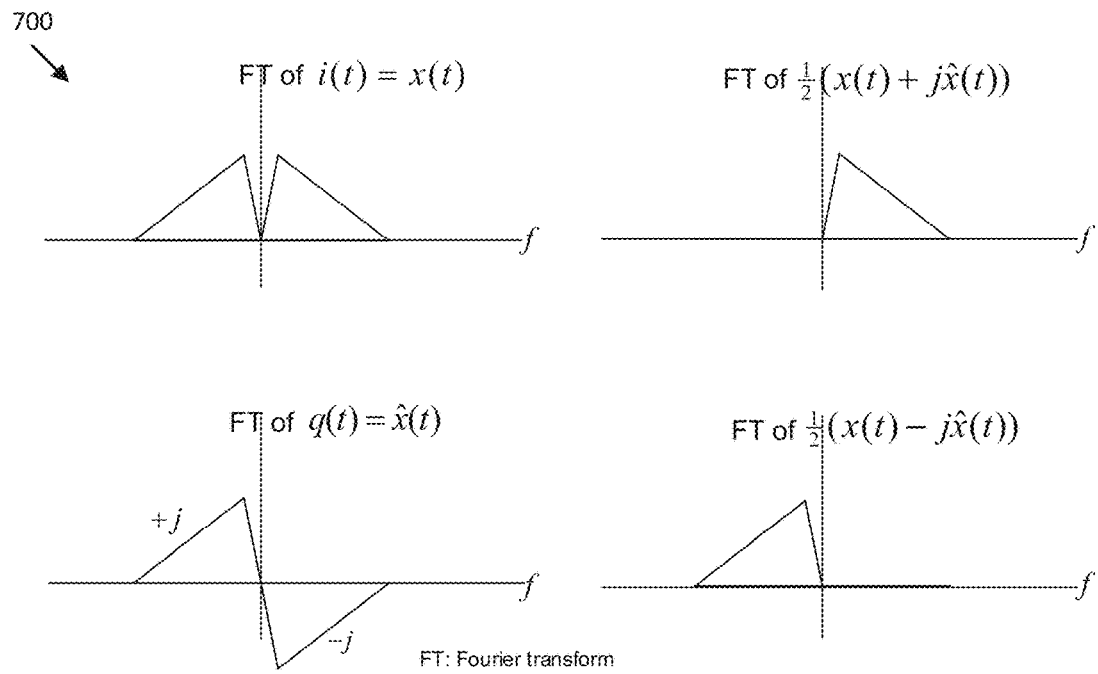
FIG. 7 illustrates a diagram of spectra.

FIG. 7 illustrates a diagram of spectra. Forming a baseband signal into an analytical signal using a Hilbert transform is shown in FIG. 7 for both selecting an upper side band and a lower side band, and then the quadrature modulator translates it into a carrier frequency. For a given i(t)=x(t), q(t)=x̂(t) (i.e., a Hilbert transformed version of i(t)=x(t)), the analytical signals $$\frac{1}{2}(x(t) + j\hat{x}(t))$$

for an upper side band, and $$\frac{1}{2}(x(t) + j\hat{x}(t))$$

for a lower sideband may be formed. The scale change to ½ here is necessary for easy visual comparison.

Figure 8:
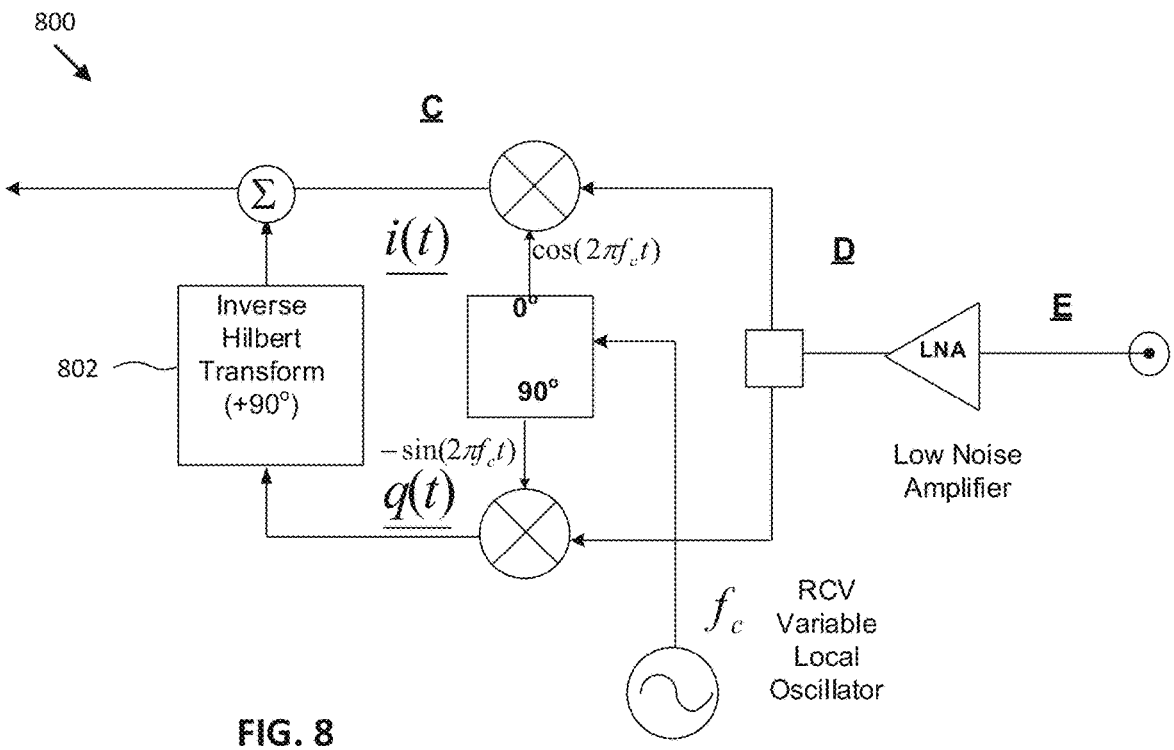
FIG. 8 illustrates a diagram of an SSB generator with an inverse Hilbert transform.

FIG. 8 illustrates a diagram of an SSB generator with an inverse Hilbert transform. As can be seen from FIG. 8, H(x̂(t))=−x(t), the inverse of which is the same Hilbert transform, but negative. In FIG. 8, the Hilbert transform block 802 is denoted as +90° phase shifter, rather than −90°.

The present apparatus and method provides transceiver architecture in order to alleviate DC offset and carrier leakage, IQ phase and amplitude imbalance and flicker noise due to direct conversion, and image cancelling requirements for heterodyne conversion architecture. The present apparatus and method provide a low IF heterodyne scheme with digital implementation of image cancelling.

Due to digital implementation of this scheme, IQ phase and amplitude balance of a digital IF is nearly perfect within digital computation accuracy, and there is no DC offset. An RF quadrature modulator and demodulator may have amplitude and phase imbalance but the image may be suppressed further by filtering without impacting the main signal. The present apparatus and method also may have DC offset but it is out of band (i.e., there is no overlap with the main signal thus easy to use DC blocking). The present apparatus and method provide doubling of the sampling speed.

Figure 9:
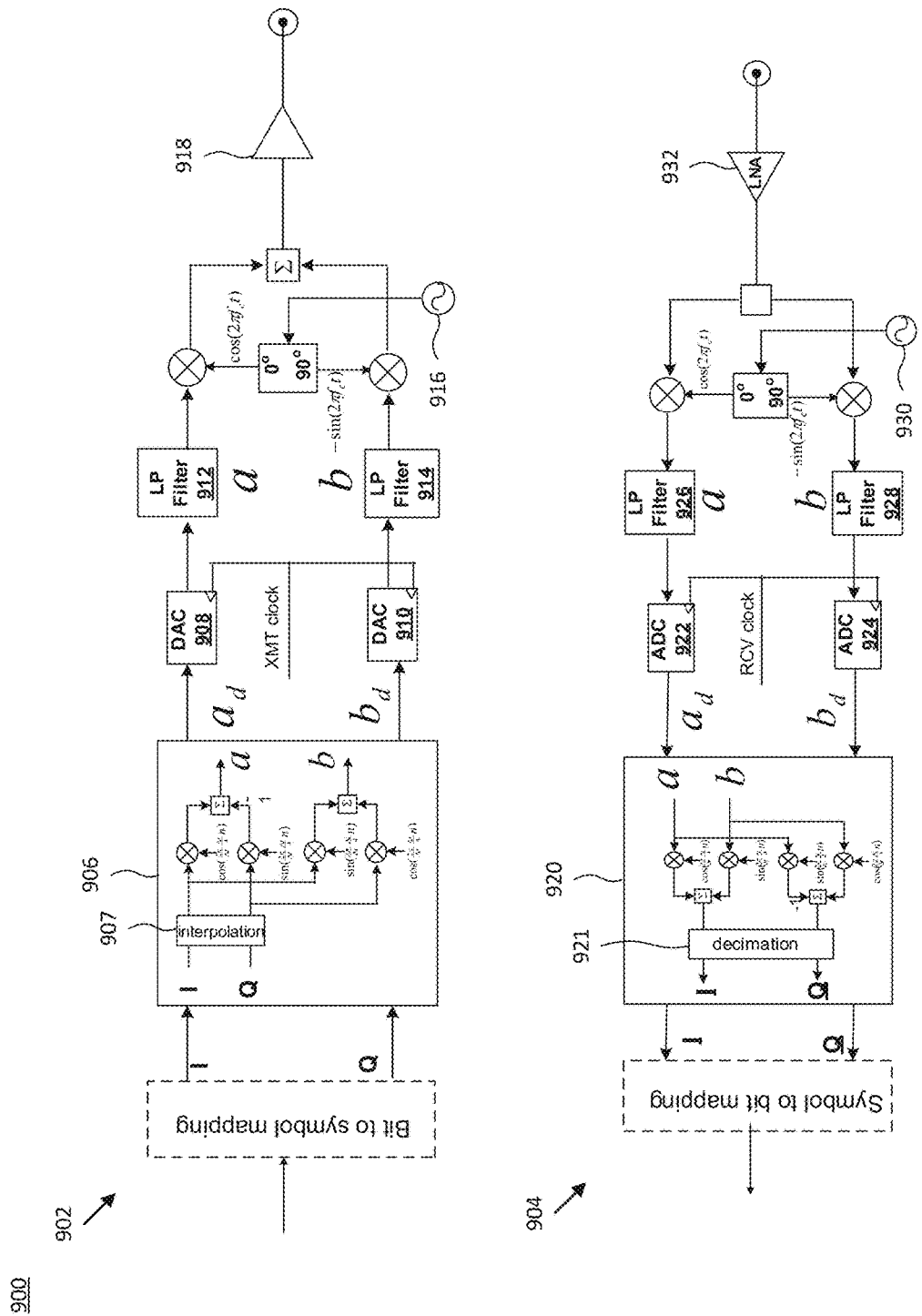
FIG. 9 illustrates a diagram of a digital image-cancelling transceiver, according to an embodiment.

FIG. 9 illustrates a diagram of a digital image-cancelling transceiver 900, according to an embodiment. The transceiver 900 includes a transmitter 902 and a receiver 904. The transmitter 902 includes a digital IF modulator 906 with an interpolation filter 907, DACs 908 and 910, LPFs 912 and 914, a variable LO 916 and a power amplifier (PA) 918. The receiver 904 includes a digital IF demodulator 920 with a decimation filter 921, ADCs 922 and 924, LPFs 926 and 928, a variable LO 930 and a low noise amplifier (LNA) 932.

I and Q are digitally quadrature modulated with the symbol rate as a digital IF carrier frequency, and followed by quadrature modulation by RF carrier frequency, and both the transmitter 902 and receiver 904 are shown. The right hand side of ($a_d$, $b_d$) is the same as direct conversion in FIG. 1. If $b_d$=H($a_d$), where H( ) is a Hilbert transform (i.e., $b_d$ is Hilbert transformed version of $a_d$), then it is the same as FIG. 6 and FIG. 8 of SSB signal generation and recovery. Thus, one sideband of the spectrum of $a_d$ will be cancelled as shown in FIG. 7.

In order to generate digital IF signal ($a_d$) and its Hilbert transform ($b_d$), I and Q are interpolated 4 times (i.e., sampling frequency is 4 times of symbol rate), as given by $$\frac{\Delta t}{4} n$$

the time index of interpolated sequence with $$\frac{1}{\Delta t}$$

symbol rate, and $$\frac{4}{\Delta t}$$

sampling rate, as in Equation (3).

$$a_d + jb_d = \left[ i\left(\frac{\Delta t}{4} n\right) + jq\left(\frac{\Delta t}{4} n\right) \right] e^{j\frac{2\pi}{\Delta t} \frac{\Delta t}{4} n} \quad (3)$$

Equation (3) is for the upper sideband case. For the lower sideband case, see FIG. 7.

Figure 10:
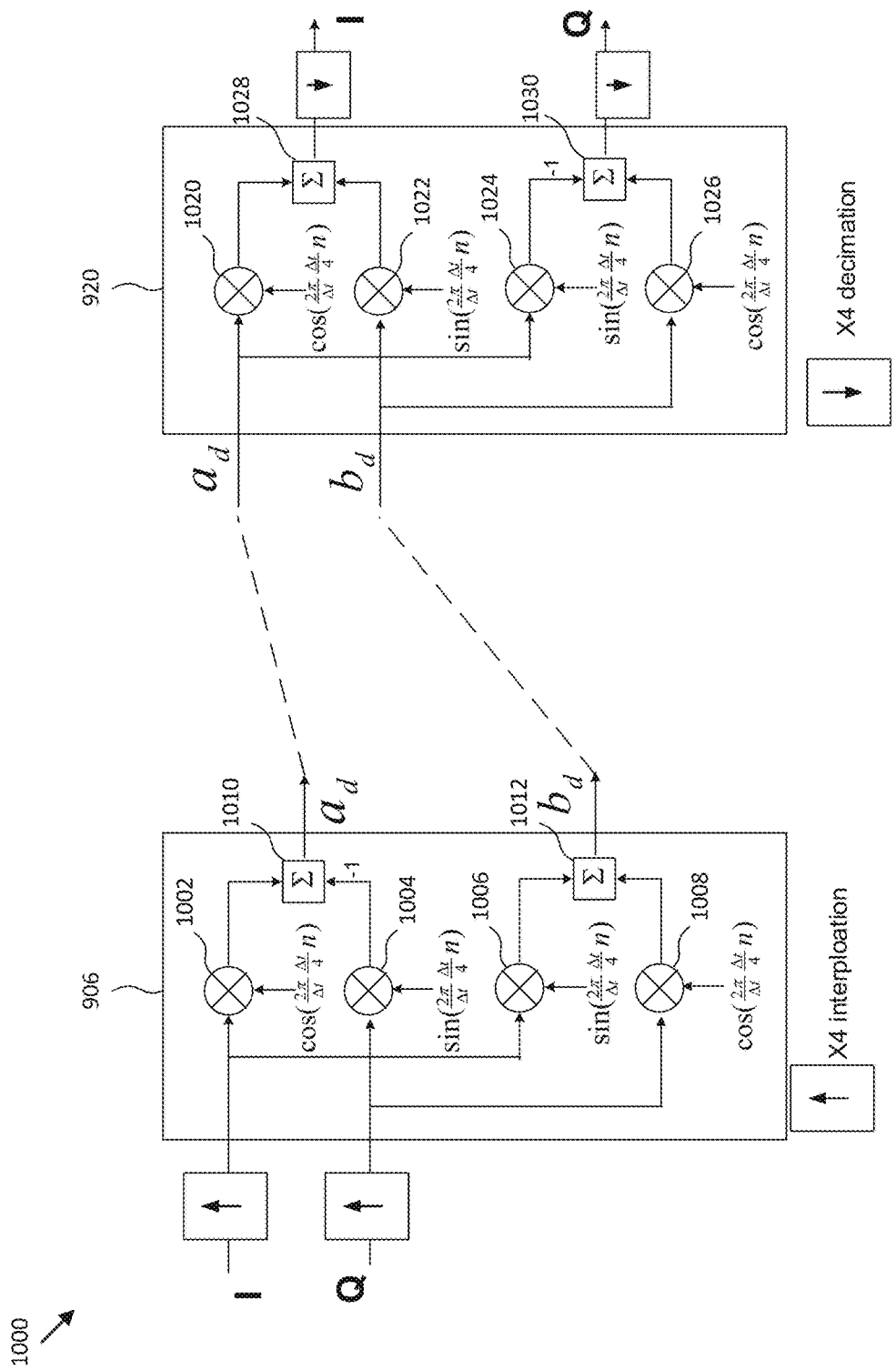
FIG. 10 illustrates a diagram of digital IF generation, according to an embodiment.

FIG. 10 illustrates a diagram of digital IF generation, according to an embodiment. FIG. 10 depicts the digital IF modulator 906 and the digital IF demodulator 920. The modulator 906 includes multipliers 1002, 1004, 1006 and 1008, as well as summation blocks 1010 and 1012. The I baseband signal is sent to the multiplier 1002 and is multiplied by $$\cos\left(\frac{2\pi}{\Delta t} \frac{\Delta t}{4} n\right).$$

The I baseband signal is sent to multiplier 1006 and is multiplied by $$\sin\left(\frac{2\pi}{\Delta t} \frac{\Delta t}{4} n\right).$$

The Q baseband signal is sent to multiplier 1004 and is multiplied by $$\sin\left(\frac{2\pi}{\Delta t} \frac{\Delta t}{4} n\right).$$

The Q baseband signal is sent to multiplier 1008 and is multiplied by $$\cos\left(\frac{2\pi}{\Delta t} \frac{\Delta t}{4} n\right).$$

The outputs of multiplier 1002 and 1004 are summed at 1010 to produce $a_d$, and the outputs of multiplier 1006 and 1008 are summed at 1012 to produce $b_d$.

The demodulator 920 includes multipliers 1020, 1022, 1024 and 1026, as well as summation blocks 1028 and 1030. The $a_d$ signal is sent to the multiplier 1020 and is multiplied by $$\cos\left(\frac{2\pi}{\Delta t} \frac{\Delta t}{4} n\right).$$

The $a_d$ signal is sent to multiplier 1024 and is multiplied by $$\sin\left(\frac{2\pi}{\Delta t} \frac{\Delta t}{4} n\right).$$

The $b_d$ signal is sent to multiplier 1022 and is multiplied by $$\sin\left(\frac{2\pi}{\Delta t} \frac{\Delta t}{4} n\right).$$

The $b_d$ signal is sent to multiplier 1026 and is multiplied by $$\cos\left(\frac{2\pi}{\Delta t} \frac{\Delta t}{4} n\right).$$

The outputs of multipliers 1020 and 1022 are summed at 1028 to produce the I baseband signal, and the outputs of multipliers 1024 and 1026 are summed at 1030 to produce the Q baseband signal.

The digital IF carrier frequency is the same as symbol rate $$\left(\frac{1}{\Delta t}\right)$$

and the sampling is 4 times of symbol rate. The interpolated sequence is denoted as $$i\left(\frac{\Delta t}{4} n\right) \text{ and } q\left(\frac{\Delta t}{4} n\right).$$

I and Q are sequences sampled at symbol rate (1/$\Delta t$), and interpolated by a factor of 4 times. Digital quadrature modulators produce $a_d$ and $b_d$ with the same IF carrier frequency as the symbol rate (1/$\Delta t$), where $b_d$ is Hilbert transform of $a_d$. By forming an analytical signal of $a_d$+$jb_d$ a lower sideband is cancelled. One selection of an IF carrier frequency, $1/\Delta t = 1/T_s$, and an interpolation factor of 4, will be generalized described herein.

Figure 11:
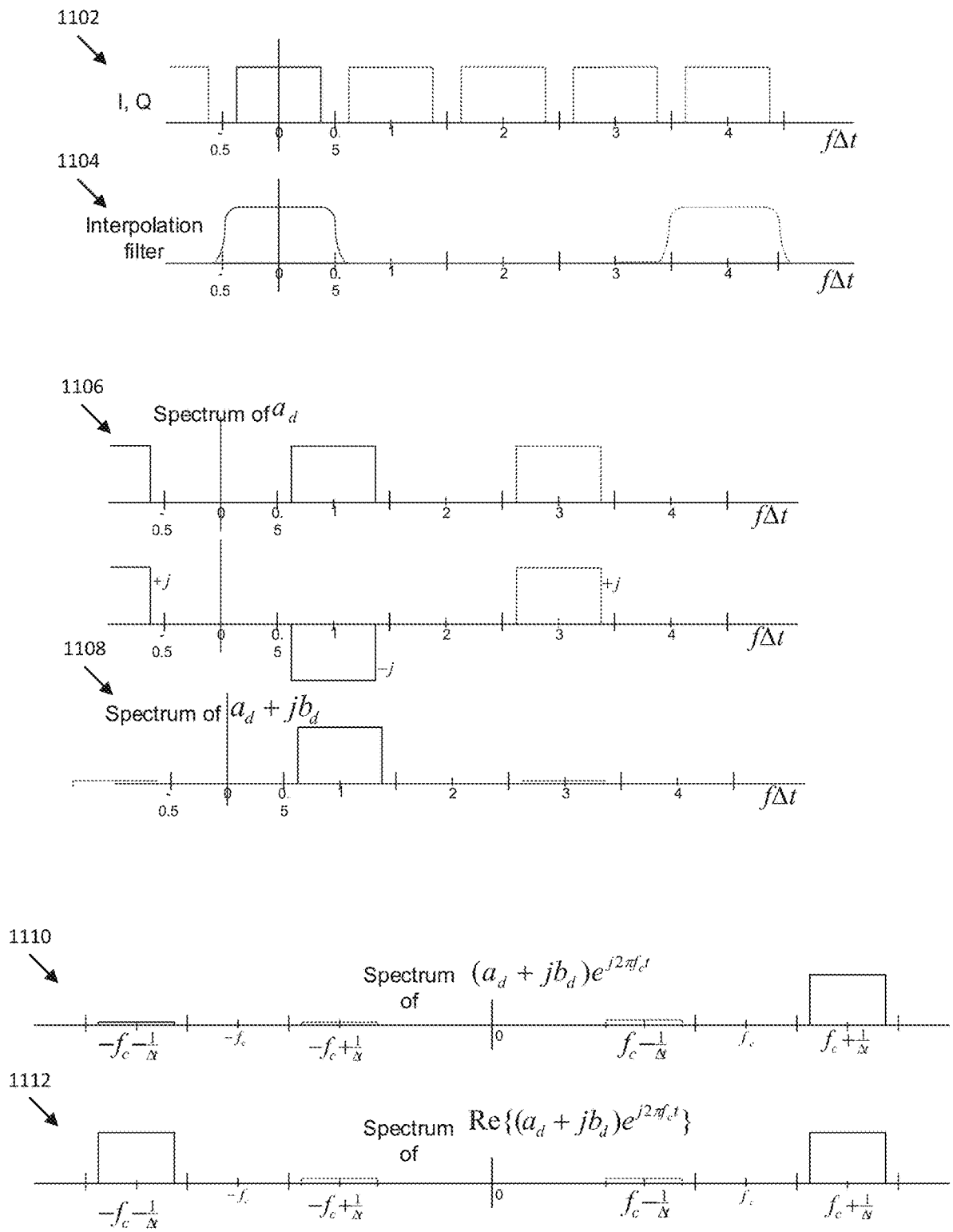
FIG. 11 illustrates a diagram of spectra, according to an embodiment.

FIG. 11 illustrates a diagram of a transmitter spectra, according to an embodiment. The action of quadrature modulator with the carrier frequency of $f_c$ is shown as being frequency shifted by $e^{j2\pi f_c t}$ with no negative frequency component, and taking a real part in the time domain. Spectra 1102 and 1104 illustrate IQ samples and the interpolation filter. Spectra 1106 and 1108 illustrate digital IF quadrature modulation and upper sideband selection. Spectra 1110 and 1112 illustrate RF quadrature modulation action. The signal processing of FIG. 11 can be summarized as in Equation (4).

$$Re\{(i+jq)e^{j2\pi fIFt}e^{j2\pi f_c t}\} = Re\{(i+jq)e^{j2\pi(fIF+f_c)t}\}. \quad (4)$$

The receiver signal processing is essentially the inverse of the transmitter, quadrature RF carrier demodulating, after low pass filtering and ADC, followed by digital IF demodulator to generate I and Q samples. However, it is different from the transmitter due to the presence of interfering image signals; not its own image, but foreign signals as interference at the image frequency. This is explained in detail from FIG. 12 through FIG. 19.

Figure 12:
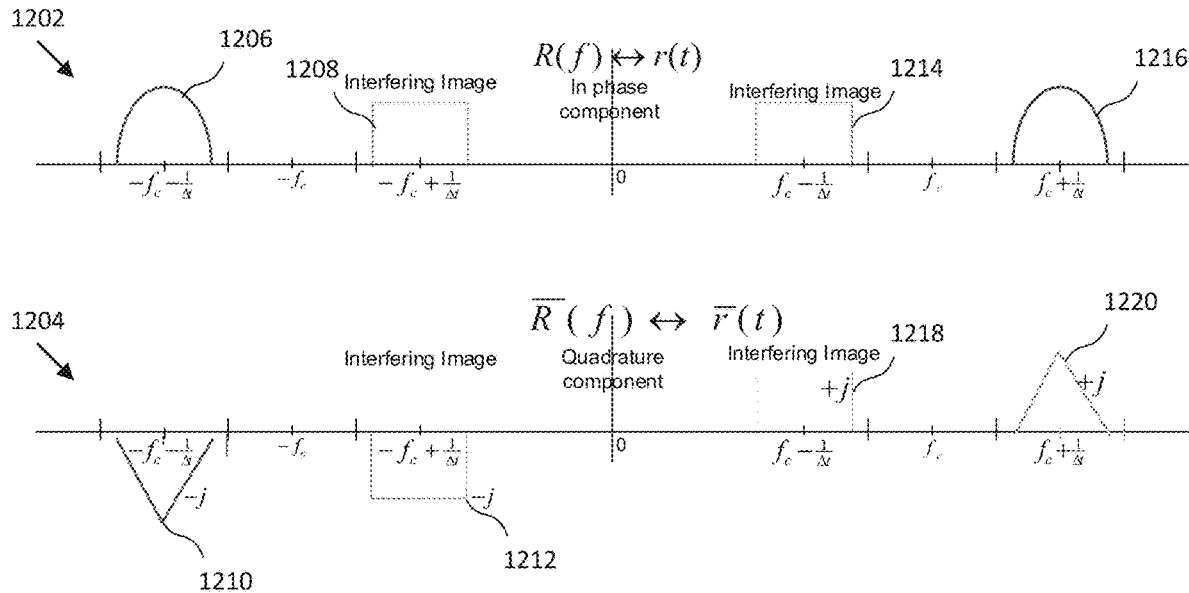
FIG. 12 illustrates a diagram of spectra in a receive signal, according to an embodiment.

FIG. 12 illustrates a diagram of spectra in a receive signal, according to an embodiment. In order to see how receiver signal processing works, it is convenient to decompose a received signal into in-phase and quadrature phase components even though it is a single time domain signal, as shown in FIG. 12. In-phase is denoted as r(t) and quadrature as r̄(t), which are treated one at a time, and the result will be combined in order to obtain I, Q samples.

A receive signal (frequency spectrum) is represented by two frequency components: an in-phase component 1202 and a quadrature phase component 1204. The signal is real in the time domain and thus the even symmetry for in-phase and odd symmetry for quadrature phase component is shown. 1206, 1208, 1210 and 1212 are negative frequencies and 1214, 1216, 1218 and 1220 are positive frequencies. +j and −j indicate phases of 90°, −90°, respectively.

Figure 13:
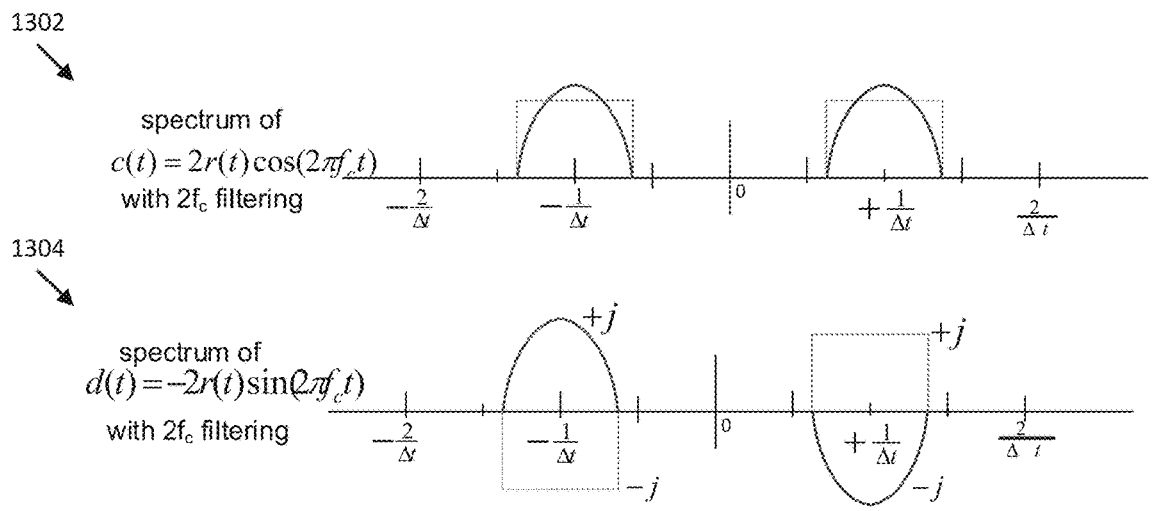
FIG. 13 illustrates a diagram of spectra, according to an embodiment.

FIG. 13 illustrates a diagram of spectra, according to an embodiment. The in-phase is demodulated down to digital IF frequency. The signal spectra 1302 and 1304 is shown in FIG. 13. Twice the carrier frequency component is filtered out. At this point, the interfering image is mixed up with the target signal (upper sideband). c(t) is (in-phase) part of a(t), d(t) is (in-phase) part of b(t). Twice the carrier frequency component is filtered out. At this point, the interfering image is mixed up with the target signal.

c(t) is a part of a(t) and d(t) a part of b(t), corresponding to the in-phase part of the RF signal, r(t). Later the quadrature part of RF, r̄(t) will be processed and the other part of a(t) and b(t), denoted as c̄(t) and d̄(t) respectively, will be obtained. c(t) and d(t) are processed by the digital IF demodulator 920, shown in FIG. 10, in order to obtain a part of I and Q. Later c̄(t) and d̄(t) are processed similarly by digital IF demodulator 920 in order to obtain the other part of I and Q.

Figure 14:
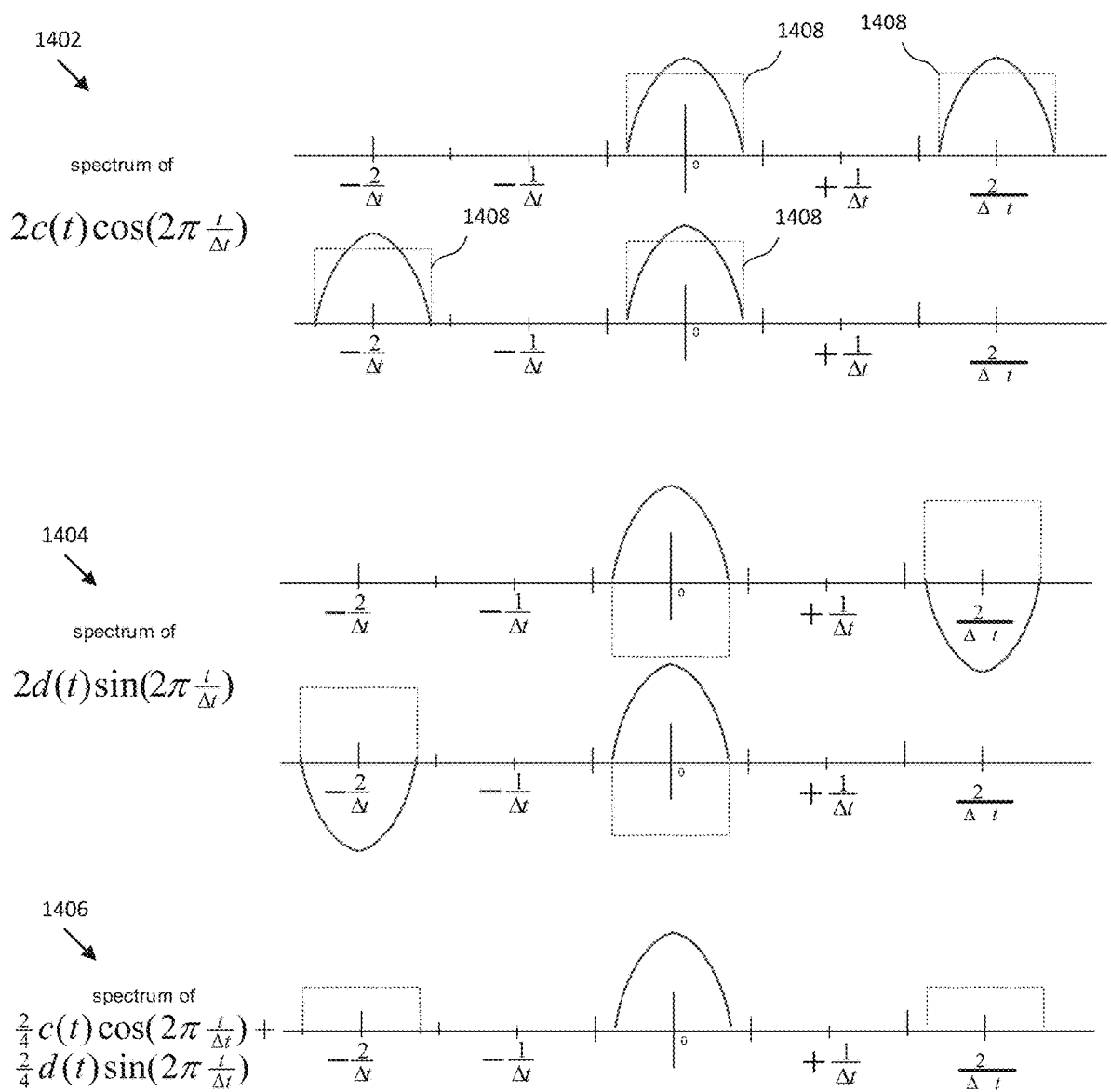
FIG. 14 illustrates a diagram of frequency domain spectra, according to an embodiment.

FIG. 14 illustrates a diagram of frequency domain spectra, according to an embodiment. In order to obtain part of the I signal, as shown in FIG. 10, the system computes $$\frac{2}{4}c(t)\cos\left(2\pi\frac{t}{\Delta t}\right) + \frac{2}{4}d(t)\sin\left(2\pi\frac{t}{\Delta t}\right)$$

and their frequency domain spectra is shown schematically by spectra 1402 and 1404 in order to see the cancellation. Spectrum 1406 shows the result. The I part of digital IF demodulator processing of c(t) and d(t) is shown in FIG. 14. The interfering image 1408 is cancelled around the DC value and the main upper sideband (I-signal) is cancelled around double the digital IF carrier frequency. The image amplitude is reduced by ½ compared to the I-signal.

Figure 15:
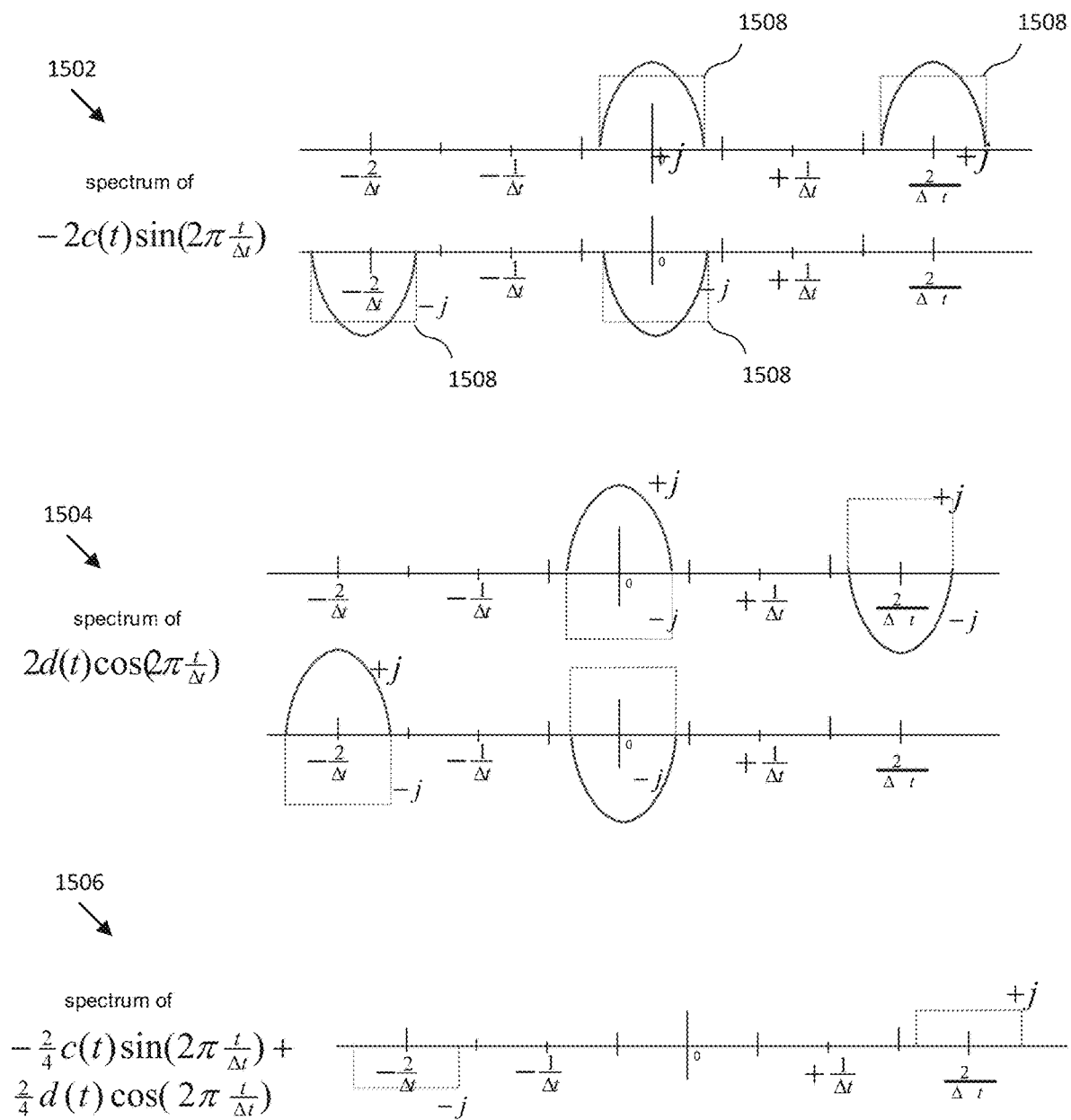
FIG. 15 illustrates a diagram of frequency domain spectra, according to an embodiment.

FIG. 15 illustrates a diagram of frequency domain spectra, according to an embodiment. In order to obtain part of the Q signal, the system computes $$-\frac{2}{4}c(t)\sin\left(2\pi\frac{t}{\Delta t}\right) + \frac{2}{4}d(t)\cos\left(2\pi\frac{t}{\Delta t}\right)$$

and their frequency domain spectrum is shown schematically by spectra 1502 and 1504 in FIG. 15 in order to see the cancellation. Spectrum 1506 shows the result. The Q part of the digital IF demodulator processing of c(t) and d(t) is shown in FIG. 15. They are cancelled around the DC value and the interfering image 1508 is cancelled around double the digital IF carrier frequency. The image amplitude is reduced by ½.

Figure 16:
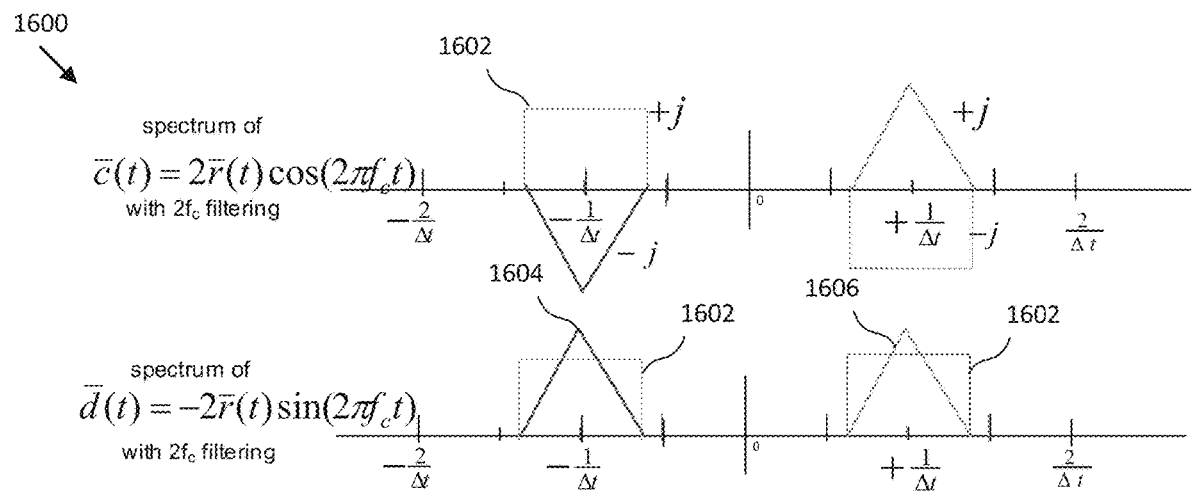
FIG. 16 illustrates a diagram of spectra, according to an embodiment.

FIG. 16 illustrates a diagram of spectra 1600, according to an embodiment. Twice the carrier frequency component is filtered out. At this point, the interfering image 1602 is mixed up with the target signal (upper sideband). The process is essentially the same as in-phase component processing. c̄(t) is (quadrature) part of a(t), and d̄(t) (quadrature) part of b(t). Twice the carrier frequency is filtered out. At this point, the interfering image 1602 is mixed up with the target 1604 and 1606.

Figure 17:
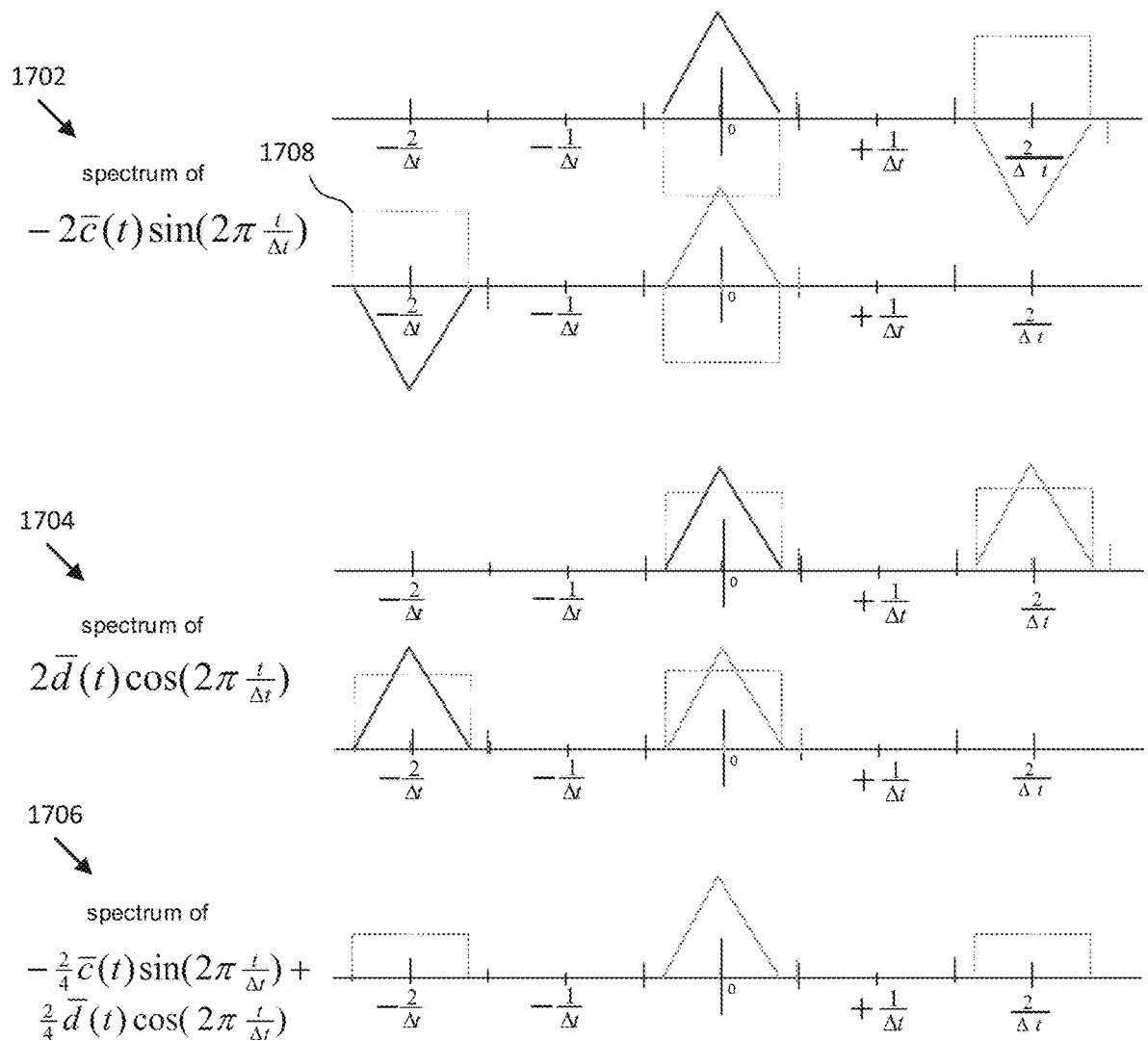
FIG. 17 illustrates a diagram of frequency domain spectra, according to an embodiment.

FIG. 17 illustrates a diagram of frequency domain spectra, according to an embodiment. In order to obtain part of the Q signal, the system computes $$-\frac{2}{4}\bar{c}(t)\sin\left(2\pi\frac{t}{\Delta t}\right) + \frac{2}{4}\bar{d}(t)\cos\left(2\pi\frac{t}{\Delta t}\right).$$

A step by step process is shown by spectra 1702 and 1704. Spectrum 1706 shows the result. The Q part of the digital IF demodulation processing of c̄(t) and d̄(t) is shown in FIG. 17 The interfering image 1708 is cancelled around the DC value and the main upper sideband (Q-signal) is cancelled around double the digital IF carrier frequency. The image amplitude is reduced by ½ compared to Q-signal.

Figure 18:
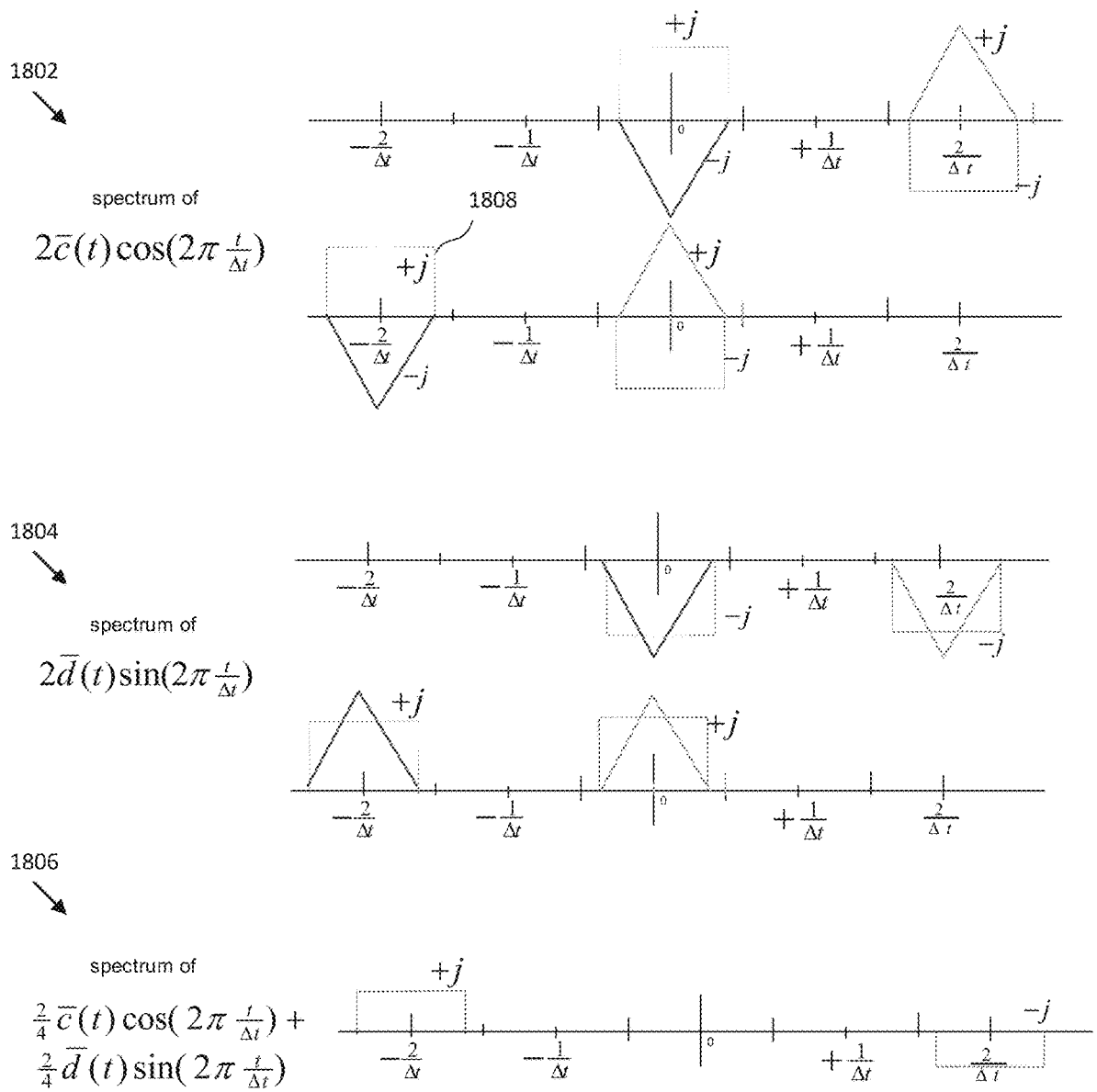
FIG. 18 illustrates a diagram of frequency domain spectra, according to an embodiment.

FIG. 18 illustrates a diagram of frequency domain spectra, according to an embodiment. In order to obtain part of the I signal (part of), the system computes $$\frac{2}{4}\bar{c}(t)\cos\left(2\pi\frac{t}{\Delta t}\right) + \frac{2}{4}\bar{d}(t)\sin\left(2\pi\frac{t}{\Delta t}\right).$$

A step by step process is shown by spectra 1802 and 1804. Spectrum 1806 shows the result. I part of digital IF demodulator processing of c̄(t) and d̄(t) are shown in FIG. 18. They are cancelled around the DC value and the interfering image 1808 is cancelled around double the digital IF carrier frequency. The image amplitude is reduced by ½.

Figure 19:
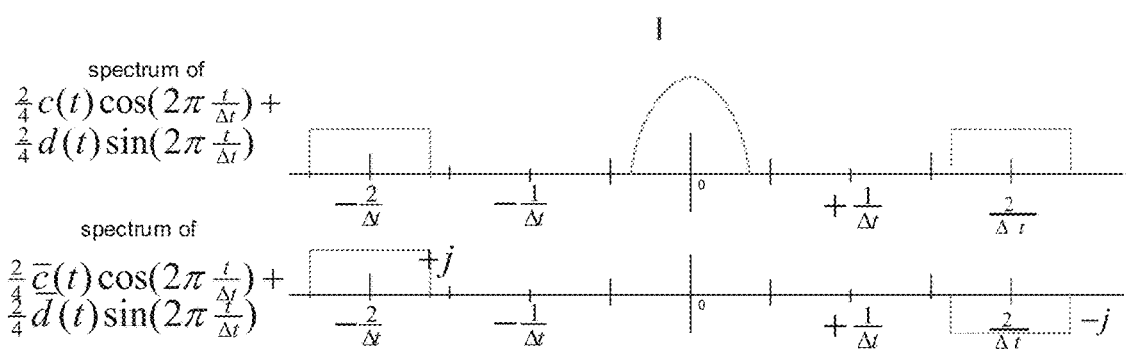
FIG. 19 illustrates a diagram of I and Q signal spectra, according to an embodiment.
Figure 19:
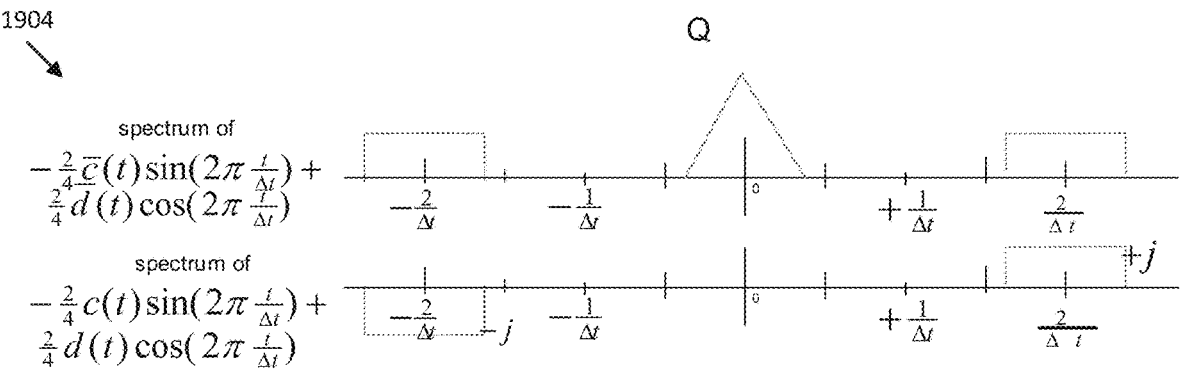

FIG. 19 illustrates a diagram of I and Q signal spectra, according to an embodiment. As shown in spectra 1902 and 1904, the interfering image signal should be removed by filtering. The decimation filter will accomplish it. The interfering image signal should be removed by filtering. The decimation filter will accomplish it.

As described above, radio channels are band limited and the transmit signal must be fit into a designated channel cleanly, without spilling over to adjacent channels. It may be called clean channel occupancy. Regulatory specification in the form of a spectrum mask must be met. In the receive direction, a selected channel is processed so that the performance is acceptable even with adjacent channel presence and interference. This is called channel selectivity.

Figure 20:
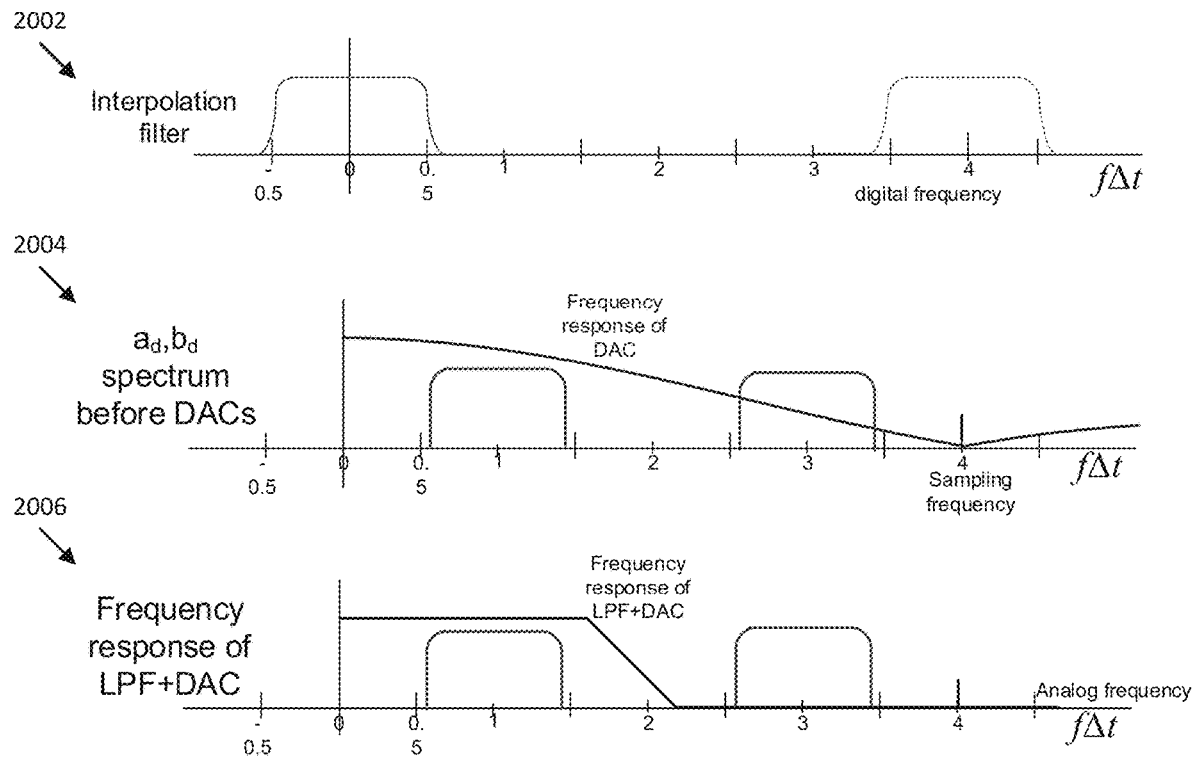
FIG. 20 illustrates a diagram of a transmitter spectra with the digital IF being the same as symbol rate, according to an embodiment.

FIG. 20 illustrates a diagram of a transmitter spectra with the digital IF being the same as symbol rate, according to an embodiment. For the transmitter, the interpolation filters (I and Q) eliminate frequency components from about 0.5 to 2.0 of symbol rate (½ of sampling rate) as shown in spectrum 2002. After digital IF modulation, $a_d$, $b_d$ are generated and will be converted to analog and low pass filtered shown in spectra 2004 and 2006. The combined frequency response of DAC and LPF should be flat in the passband. Filtering in the transmitter includes interpolation filter, DAC and LPF+DAC frequency response.

A practical design of LPF may compensate for DAC frequency response such that the combined frequency response with DAC is flat. An objective of LPF is to remove higher digital harmonics. For clean channel occupancy and band limiting the interpolation filters play a major role. A pulse shaping filter can be done by twice the symbol rate in a direct conversion transceiver. However, the x4 interpolation filter can be a shaping filter as well. In practice, the RF filter may be added to further clean the signal but the clean channel occupancy filter is mainly done at the baseband.

Figure 21:
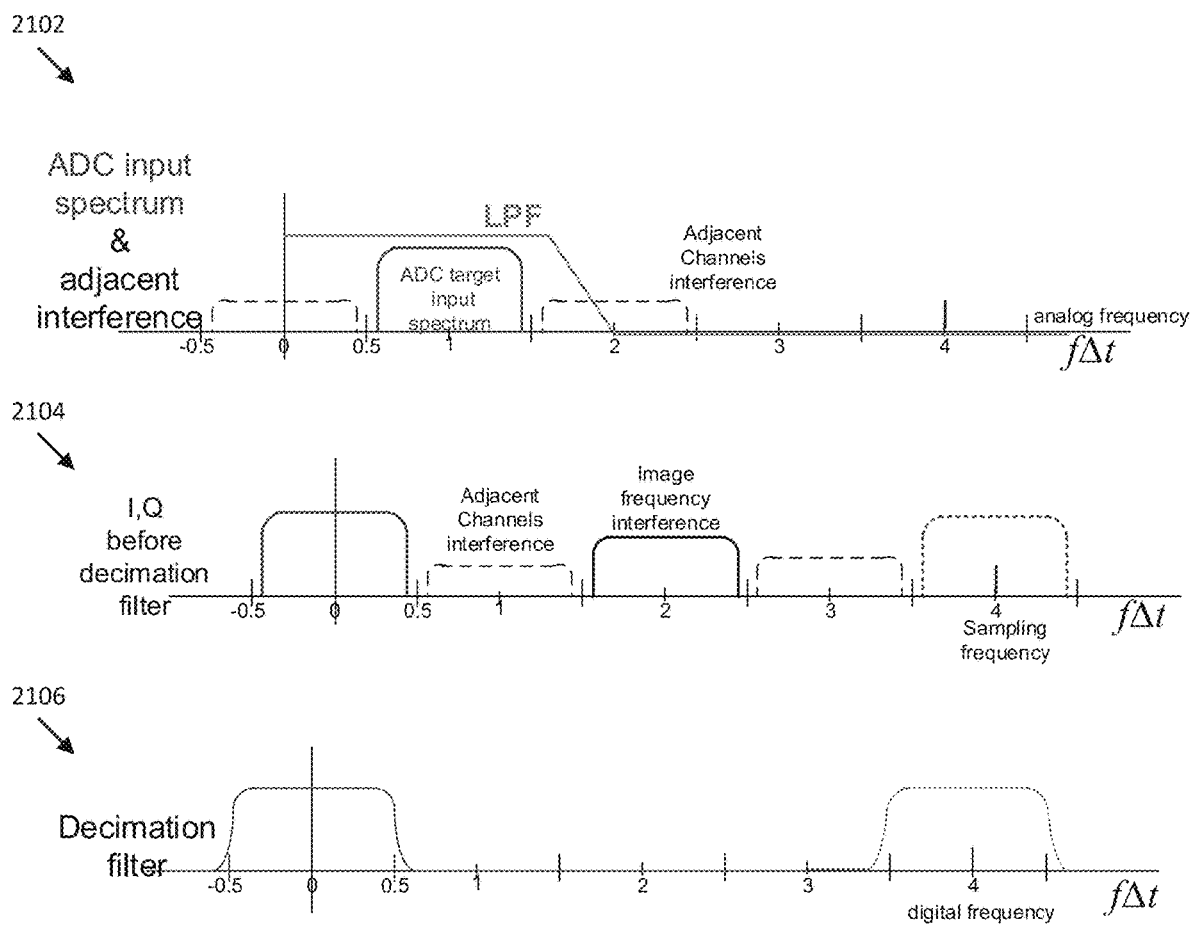
FIG. 21 illustrates a diagram of a receiver spectra with the digital IF being the same as symbol rate, according to an embodiment.

FIG. 21 illustrates a diagram of a receiver spectra with the digital IF being the same as symbol rate, according to an embodiment. The receiver filtering LPF before ADC is for anti-aliasing and should remove all frequency above 2 times the symbol rate (i.e., ½ of sampling rate). After digital IF demodulation, all adjacent channel interference, including image frequency interference, is removed by a decimation filter.

If there is no adjacent signal interference, the signals before the ADC should have a spectrum centered on a digital IF frequency (i.e., symbol rate). As described above, the spectra of c(t) and d(t) in FIG. 13; and the spectra of $\bar{c}$(t) and $\bar{c}$(t) in FIG. 16 are centered on a digital IF frequency, as shown by spectrum 2102. The LPF needs to eliminate the frequency above ½ sampling rate (i.e., 2 times symbol rate). If there is adjacent channel interference, this LPF should be sharpened so there is no aliasing due to the interference. Unlike the LPF in the transmitter, this LPF is important for channel selectivity. Together with the decimation filter, the LPF mainly determines the channel selectivity, as shown by spectra 2104 and 2106, and is anti-aliasing and at the same time responsible for out of band rejection.

The decimation filter can be the other half of pulse shaping filter together with interpolation filter at the transmitter. Orthogonal frequency division multiplexing (OFDM) signals do not need a shaping filter and thus there is additional freedom in selecting interpolation and decimation filters. On the other hand, there is no reason the same type of shaping filter cannot used for OFDM case. The out of band rejection requirement is the same and only the transition from pass-band to stop-band may be different.

Referring back to FIG. 10, digital IF modulation and demodulation is described in detail. As described above, denoting symbol time as Δt and sampling time as $$\frac{\Delta t}{4}$$

(i.e., four samples per symbol period), and interpolated samples as $$i\left(\frac{\Delta t}{4}n\right) \text{ and } q\left(\frac{\Delta t}{4}n\right),$$

the digital IF modulation computation is given by Equation (3), and demodulation is the inverse.

By selecting a digital IF carrier frequency to be the same as the symbol rate and 4 times interpolation, the computation is greatly simplified since, as in Table 2:

TABLE 2

| n | 0 | 1 | 2 | 3 | 4 | 5 | 6 |
|---|---|---|---|---|---|---|---|
| $\cos\left(\frac{2\pi}{\Delta t}\frac{\Delta t}{4}n\right)$ | 1 | 0 | −1 | 0 | 1 | 0 | −1 |
| $\sin\left(\frac{2\pi}{\Delta t}\frac{\Delta t}{4}n\right)$ | 0 | 1 | 0 | −1 | 0 | 1 | 0 |

$$\cos\left(\frac{2\pi}{\Delta t}\frac{\Delta t}{4}n\right) \text{ and } \sin\left(\frac{2\pi}{\Delta t}\frac{\Delta t}{4}n\right)$$

are 0, 1, or −1. Furthermore, numerically it is a perfect implementation, and thus no errors unlike analog circuit implementation.

There is flexibility in the selection of the digital IF carrier frequency and interpolation factor. For example, if the digital IF carrier frequency ($f_{IF}$) is chosen to be 2 times the symbol rate $$\left(\frac{F_k}{\Delta t} = \frac{2}{\Delta t}\right),$$

if $f_{IF}$ is 3 times the symbol rate, the interpolation factor is 12. The selections of the digital IF carrier and an interpolation factor so that $$\cos\left(\frac{2\pi \cdot F_k}{I_k}n\right) \text{ and } \sin\left(\frac{2\pi \cdot F_k}{I_k}n\right)$$

are 0, 1, −1 is summarized in Table 3.

TABLE 3

| Digital IF carrier $\left(\frac{F_k}{\Delta t}\right)$ | 0.5 | 1 | 1.5 | 2 | 2.5 | 3 | $I_k/F_k = 4$ |

TABLE 3-continued

| Interpolation factor $\left(\frac{\Delta t}{I_k}\right)$ | 2 | 4 | 6 | 8 | 10 | 12 |
| --- | --- | --- | --- | --- | --- | --- |

Figure 22:
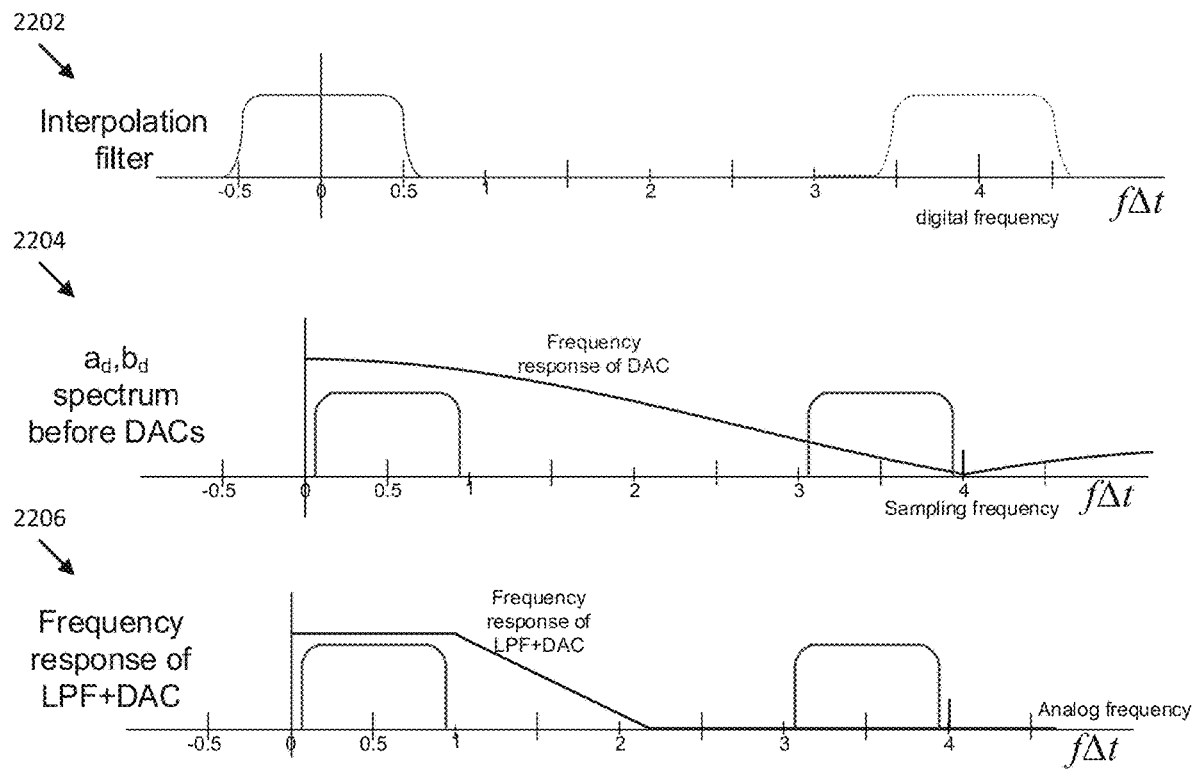
FIGS. 22 and 23 illustrate diagrams of a transmitter and receiver spectra respectively with the digital IF being half of symbol rate, according to an embodiment.
Figure 23:
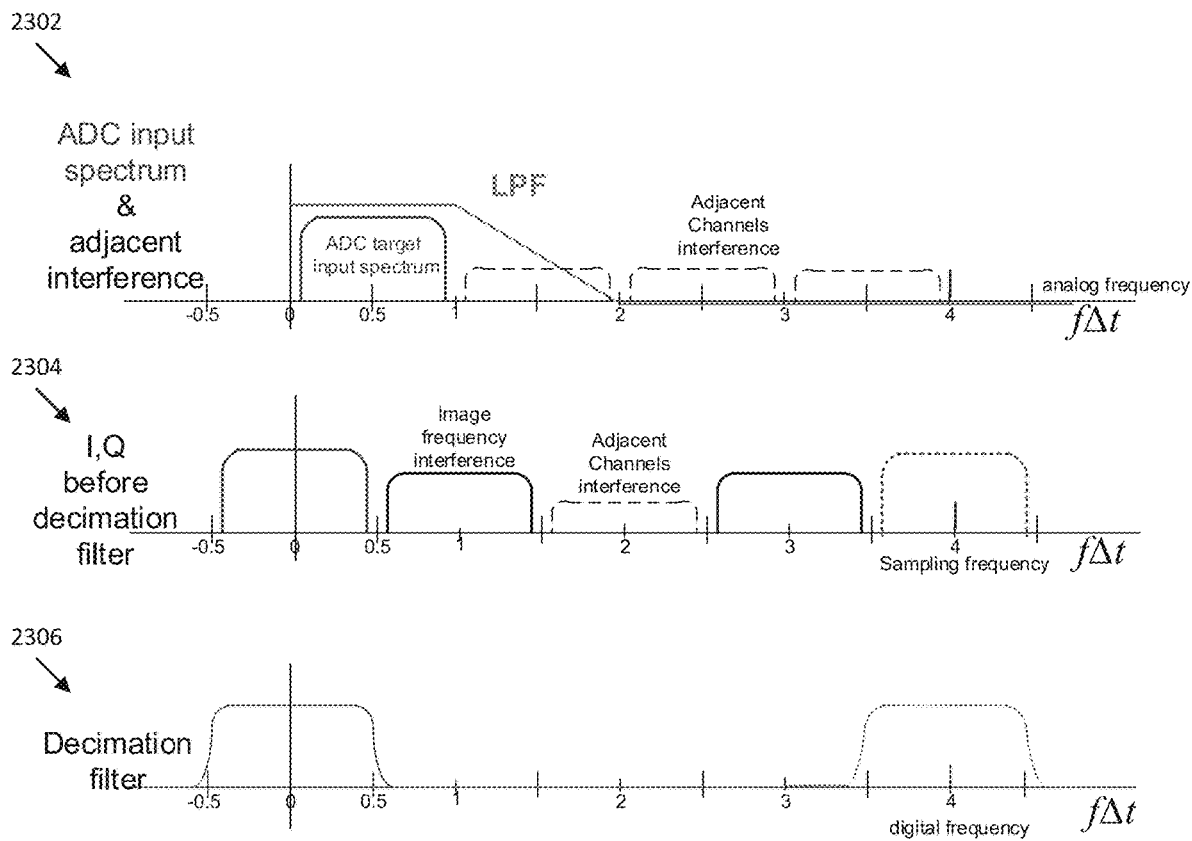

FIGS. 22 and 23 illustrate diagrams of a transmitter and receiver spectra, respectively, with the digital IF frequency being half of the symbol rate, according to an embodiment. An additional selection may be $F_k=0.5$ and $I_k=4$ with $I_k/F_k=8$. This selection uses multiplications since $$\cos\left(\frac{2\pi \cdot F_k}{I_k}n\right) = \cos\left(\frac{2\pi \cdot}{8}n\right) = 1, \frac{1}{\sqrt{2}}, 0, \frac{1}{\sqrt{2}}, -1, \frac{1}{\sqrt{2}}, 0, \frac{1}{\sqrt{2}}$$

with n=0, 1, 2, 3, 4, . . . , 7, and similarly for the sine part. This selection relaxes the analog LPF (i.e., the transition from passband to stopband has much more room). On the other hand, it takes a full advantage of digital image cancelling (i.e., filtering the image this close would be very difficult). Filtering in the transmitter is performed with a digital IF frequency 0.5 times the symbol rate. LPF transition from passband to stopband is much gentler. The RF LO frequency will be offset by 0.5 symbol rate (0.5 channel bandwidth). The transition, from passband to stopband, of the anti-aliasing. LPF can be much gentler. The decimation filter will remove both image frequency interference and adjacent channel interference.

In the context of interpolation and decimation, finite impulse response (FIR) filters are often used to take an advantage of special structures of interpolation and decimation. The duration of the impulse response of FIR is finite, and thus for any FIR, the computation can be expressed as a convolution, n, k being the sequence index, as in Equation (5):

$$y(n) = \sum_{k=0}^{N-1} h(k)x(k-n) \quad (5)$$

where the input sequence is x(n), output sequence y(n) and h(k) is an impulse response of a filter. n=0, 1, 2, . . . ∞. Its frequency response is given by $$H(f) = \sum_{k=0}^{N-1} h(k)e^{-j2\pi f \cdot k}.$$

The time interval $$\left(\Delta t \text{ or } \frac{\Delta t}{4}\right)$$

is dropped between samples for convenience.

Figure 24:
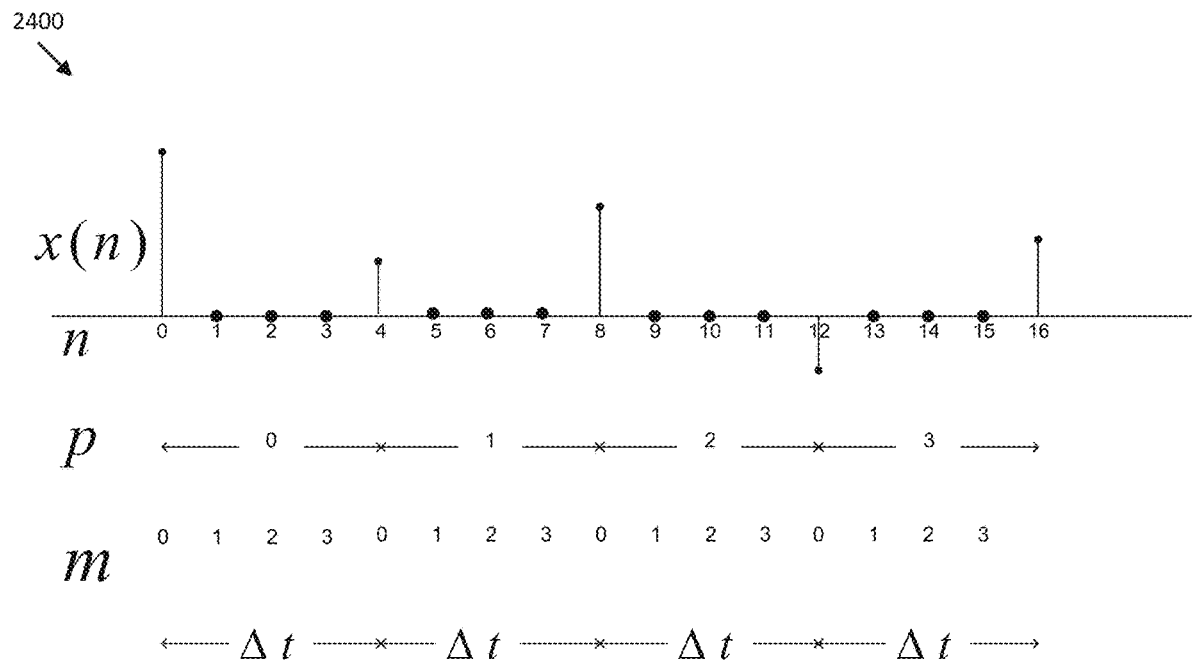
FIG. 24 illustrates a diagram of time intervals, according to an embodiment.

FIG. 24 illustrates a diagram 2400 of time intervals, according to an embodiment. In interpolation, with the interpolation factor 4, one input sample will generate 4 output samples. Formally, this can be done by inserting zeros on the input (3 zeros in case of factor 4 and thus 4 input samples with zeros), then use Equation (5) to generate 4 output samples. Then, the index should be changed n=4p+m with m=0, 1, 2, 3 or by a pair of index (p, m). The time interval between samples is changed from Δt to $$\frac{\Delta t}{4}$$

as shown in FIG. 24. The index relationship and zeros are inserted at the input of interpolation filter.

Figure 25:
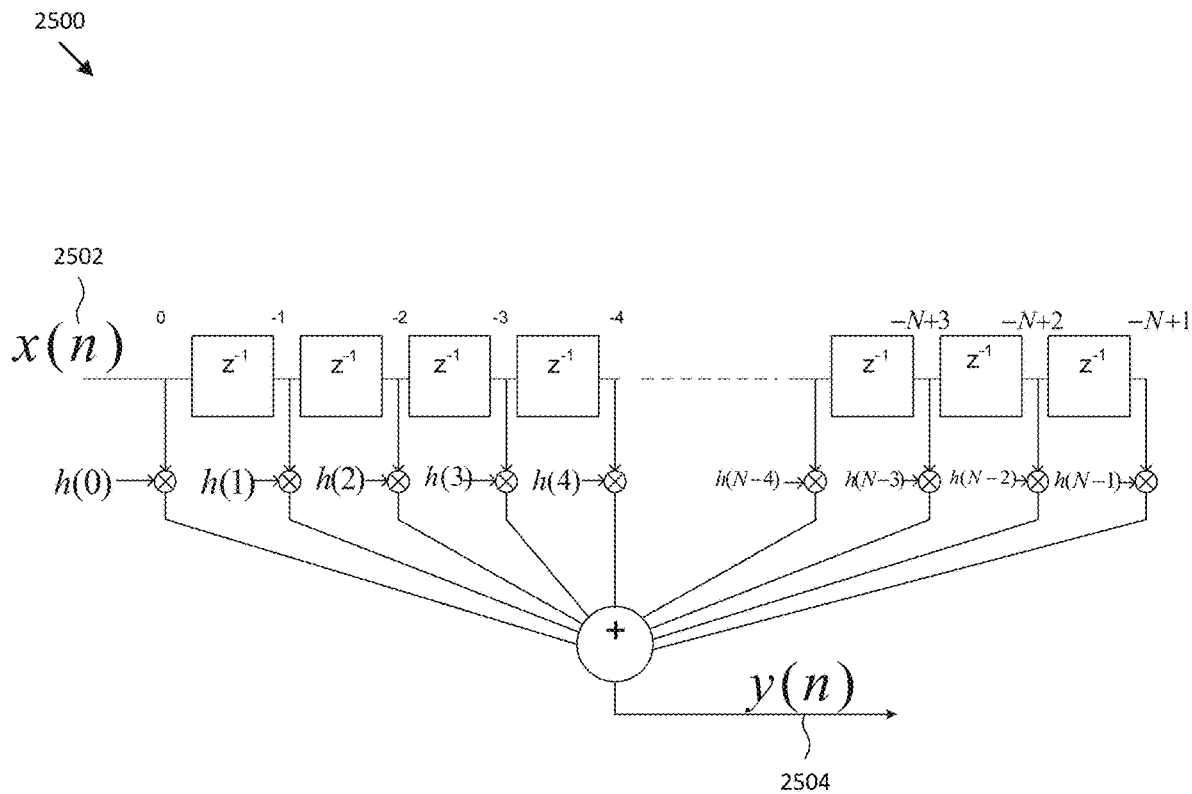
FIG. 25 illustrates a diagram of a finite impulse response (FIR) filter with shift registers, according to an embodiment.

FIG. 25 illustrates a diagram of an FIR filter 2500 with shift registers, according to an embodiment. Input x(n) 2502 is shifted into the registers by one sample and all the stored samples are shifted, and then multiplied and added to generate an output 2504. A snap shot n=0 is shown.

Figure 26:
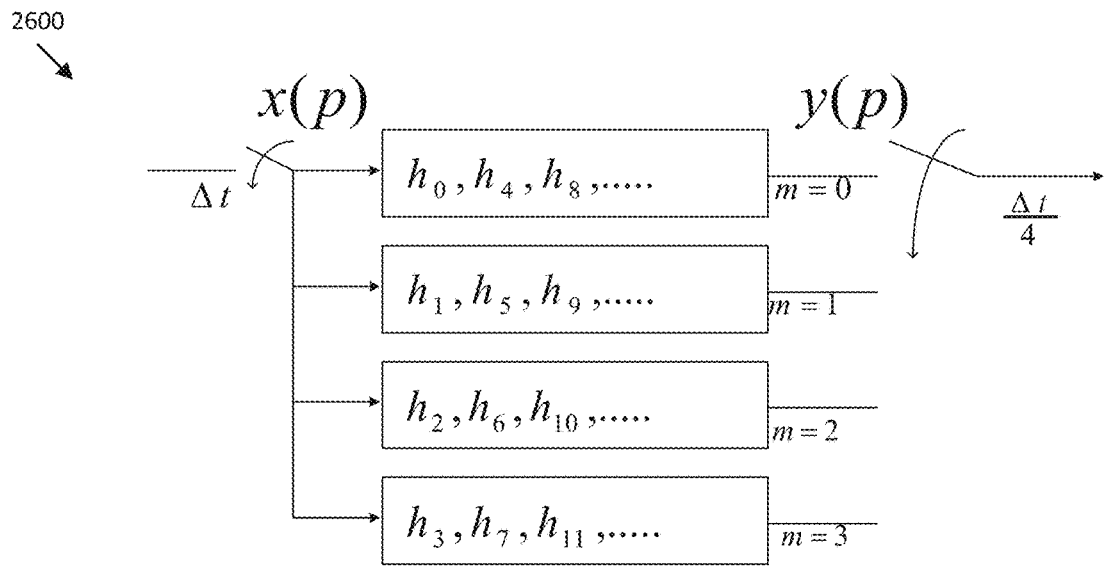
FIG. 26 illustrates a diagram of interpolation in a digital filter, according to an embodiment.

FIG. 26 illustrates a diagram of interpolation in a digital filter, according to an embodiment. An efficient computation can be organized by taking advantage of multiplication by zero. A poly-phase structure, instead of a straightforward FIR filter can be used. When a new input comes (e.g., x(0)), then the system computes 4 output samples y(0), y(1), y(2), y(3). The computation of y(0) involves only a set of filter coefficients, namely $h_0, h_4, h_8, \ldots$, and y(1) involves $h_1, h_5, h_9, \ldots$, and y(2) involves $h_2, h_6, h_{10}, \ldots$, and y(3) involves $h_3, h_7, h_{11}, \ldots$. This can be put into a block diagram 2600 shown in FIG. 26, which shows poly-phase structure of decimation filter with a factor of 4. The filter coefficients of a decimation filter are generally not the same as those of a matching interpolation filter.

Figure 27:
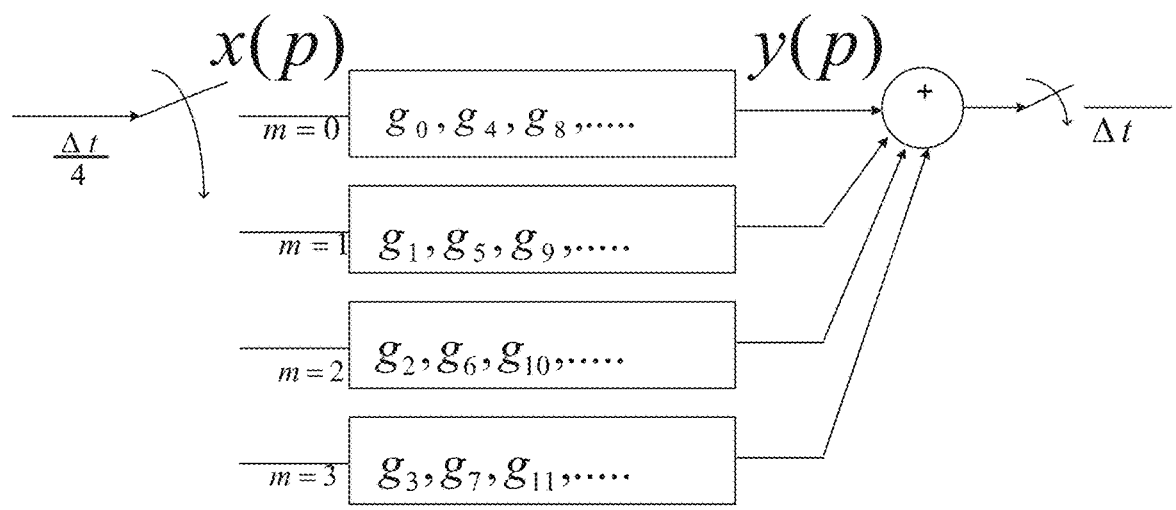
FIG. 27 illustrates a diagram of decimation in a digital filter, according to an embodiment.

FIG. 27 illustrates a diagram of decimation in a digital filter, according to an embodiment. The poly-phase structure developed for interpolation can be used for decimation. It uses the same convolution computation of Equation (5) and the structure is essentially the inverse: for 4 input samples, 1 output sample will be computed as shown by the diagram 2700 of FIG. 27. The filter coefficients of a decimation filter is in general not the same as that of an interpolation filter.

Figure 28:
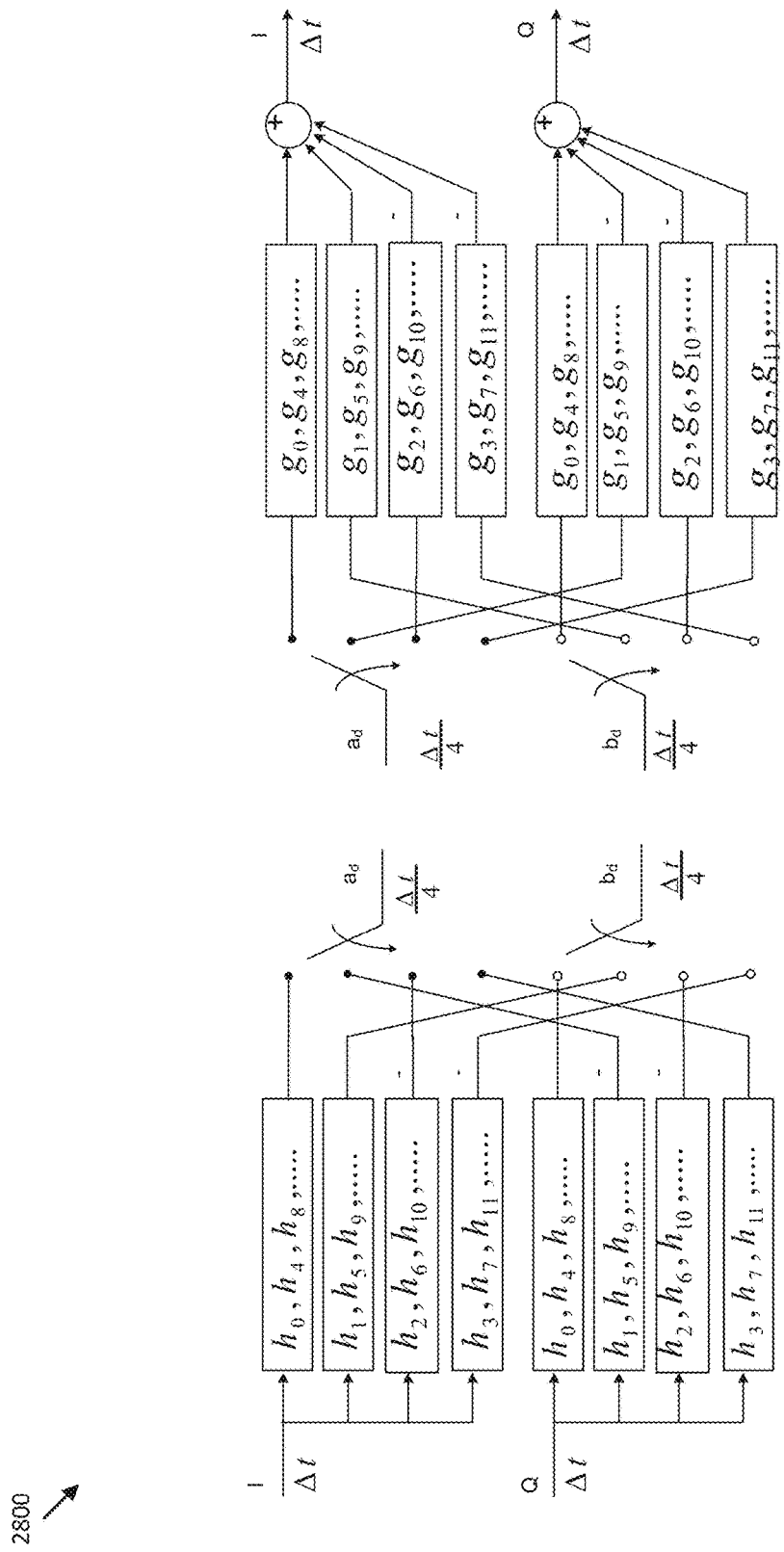
FIG. 28 illustrates a diagram of a poly-phase structure with a digital IF filter, according to an embodiment.

FIG. 28, illustrates a diagram of a poly-phase structure with a digital IF filter, according to an embodiment. With the poly-phase structure and digital IF combined, an implementation example of 902 and 920 in FIG. 10 is shown by 2800. The digital IF frequency is the same as the symbol rate and the interpolation factor is 4. Due to the ratio of digital IF frequency and interpolation factor to be 4, there is no multiplication. The upper sideband will be selected with the sign. The structure of FIG. 10 works for different selections of IF carrier frequency $$\left(\frac{F_k}{\Delta t}\right)$$

and interpolation factor $(I_k)$ by changing to $$\cos\left(\frac{2\pi \cdot F_k}{I_k}n\right) \text{ and } \sin\left(\frac{2\pi \cdot F_k}{I_k}n\right)$$

from $$\cos\left(\frac{2\pi}{\Delta t}\frac{\Delta t}{4}n\right) \text{ and } \sin\left(\frac{2\pi}{\Delta t}\frac{\Delta t}{4}n\right).$$

In order to see the impact to image cancelling performance due to amplitude imbalance, a single frequency tone is used as a test signal (i.e., $A_m \cos(2\pi f_m t)$) and its Hilbert transform is given by $A_m \sin(2\pi f_m t)$. This gets into a quadrature modulator with in-phase carrier $A_c \cos(2\pi f_c t)$, and quadrature carrier $A_c(1+\epsilon)\sin(2\pi f_c t)$ with the imbalance $1+\epsilon$. (The imbalance in dB is given by $20 \log(1+\epsilon)$. 1.0 dB imbalance is equivalent to $\epsilon=0.122$.) Then, the in-phase component after modulation is given by $A_c A_m \cos(2\pi f_m t) \cos(2\pi f_c t)$ and quadrature component by $-A_c(1+\epsilon)A_m \sin(2\pi f_m t)\sin(2\pi f_c t)$. The sum of two will be transmitted. The sum contains the lower sideband due to the imbalance and may disappear as $\epsilon \to 0$, and it is given by Equation (6).

$$\left(1+\frac{\epsilon}{2}\right)A_c A_m \cos(2\pi(f_m+f_c)t) - \frac{\epsilon}{2}A_c A_m \cos(2\pi(f_c-f_m)t) \quad (6)$$

The image rejection in dB is defined by the power ratio of an upper sideband (desired) and a lower sideband (image), and from Equation (6) it is given by Equations (7) and (8).

$$\left(\frac{\epsilon}{2+\epsilon}\right)^2 \quad (7)$$

$$IR \text{ [dB]} = 10\log\left(\frac{\epsilon}{2+\epsilon}\right)^2 \approx 10\log\left(\frac{\epsilon^2}{4}\right) \quad (8)$$

0.1 dB amplitude imbalance results in $\epsilon=0.012$, and thus IR [dB]=−45 dB. 1.0 dB amplitude imbalance will result in −25 dB image rejection. The amplitude imbalance can occur due to the gain difference between in-phase path and a quadrature phase path and the effect is the same.

Image cancellation degradation can also be shown due to quadrature phase imbalance. This is represented by $\Delta\varphi$ and a quadrature carrier is now given by $-A_c \sin(2\pi f_c t + \Delta\varphi)$.

In order to see the degradation due to quadrature phase imbalance, $A_c A_m \cos(2\pi f_m t)\cos(2\pi f_c t) - A_c A_m \sin(2\pi f_m t)\sin(2\pi f_c t + \Delta\varphi)$ is expressed in terms of upper sideband and lower sideband components, given by Equation (9).

$$\left(\frac{1+\cos(\Delta\varphi)}{2}\right)A_c A_m \cos(2\pi(f_m+f_c)t) - \quad (9)$$

$$\frac{\sin(\Delta\varphi)}{2}A_c A_m \sin(2\pi(f_m+f_c)t)$$

$$\left(\frac{1-\cos(\Delta\varphi)}{2}\right)A_c A_m \cos(2\pi(f_m-f_c)t) -$$

$$\frac{\sin(\Delta\varphi)}{2}A_c A_m \sin(2\pi(f_m-f_c)t)$$

Lower sideband power is given by $$\left(\frac{1-\cos(\Delta\varphi)}{2}\right)^2 + \left(\frac{\sin(\Delta\varphi)}{2}\right)^2$$

and upper sideband interference power is given by $$\left(\frac{\sin(\Delta\varphi)}{2}\right)^2,$$

and desired upper sideband power by $$\left(\frac{1+\cos(\Delta\varphi)}{2}\right)^2$$

where $A_c/A_m=1$ is set.

Image cancelling is given by Equation (10).

$$\frac{(1-\cos(\Delta\varphi))^2 + \sin^2(\Delta\varphi)}{(1+\cos(\Delta\varphi))^2} \approx \frac{\sin^2(\Delta\varphi)}{4} \quad (10)$$

In-band interference is given by Equation (11).

$$\frac{\sin^2(\Delta\varphi)}{(1+\cos(\Delta\varphi))^2} \approx \frac{\sin^2(\Delta\varphi)}{4} \quad (11)$$

IR [dB] is given by Equation (12).

$$IR \text{ [dB]} \approx 10 \log\left(\frac{\sin^2(\Delta\varphi)}{4}\right) \quad (12)$$

1.0 degree phase imbalance will degrade image cancelling −41 dB and at the same time the interference to signal in the upper sideband is −41 dB. The phase imbalance impact is severe in not only image generation but also interference.

When both amplitude imbalance and phase imbalance are present, an approximate image rejection would be adding Equation (7) and Equation (10).

The impact of quadrature demodulator amplitude and phase imbalance to image cancelling is considered. As expected, it is the similar to transmitter analysis except that a signal at the image location should be considered. $A_m \cos(2\pi(f_m+f_c)t)+B_{m'} \cos(2\pi(f_c-f_{m'})t)$ as a receive test signal is used. The first term is a desired upper sideband tone and the second term is a signal at the image location. $f_{m'}$ indicates that the image signal is not exactly the same frequency since it is not its own image, but the other signal. It could be represented by $B_{m'} \sin(2\pi(f_c-f_{m'})t)$. LPFs eliminate twice the carrier frequency components. An un-cancelled image signal, $$-\frac{1}{2}(\epsilon)A_c B_{m'}\cos(2\pi(f_{m'})t),$$

is present as interference after demodulation. For inverse Hilbert transform, refer to Table 1 from $\hat{x}(t)$ to $x(t)$ direction.

After quadrature demodulation and combining both in-phase and quadrature components, the output becomes, as in Equation (13).

$$\frac{1}{2}(2+\epsilon)A_c A_m \cos(2\pi f_m t) - \frac{1}{2}(\epsilon)A_c B_{m'}\cos(2\pi(f_{m'})t) \quad (13)$$

Equation (13) is identical to Equation (6) except for $B_{m'}$ in the second term. As $B_{m'}$ decreases, the interference decreases, which can be done by filtering. As $\varepsilon \to 0$, i.e., no gain imbalance, the image can be cancelled completely even $B_{m'}$ is not zero. IR in dB is given by Equation (14).

$$10\log\left[\left(\frac{B_{m'}}{A_m}\right)^2\left(\frac{\varepsilon}{2+\varepsilon}\right)^2\right] \quad (14)$$

With the same receive test signal, quadrature phase imbalance is considered, and its impact to image cancellation. In this case, after quadrature demodulation and combining both in-phase and quadrature components the output contains 4 terms, and is given by Equation (15).

$$\frac{1}{2}(1+\cos(\Delta\varphi))A_c A_m \cos(2\pi f_m t) + \quad (15)$$
$$\frac{1}{2}(1-\cos(\Delta\varphi))A_c B_{m'}\cos(2\pi(f_{m'})t) +$$
$$\frac{1}{2}\sin(\Delta\varphi)A_c A_m \sin(2\pi f_m t) + \frac{1}{2}\sin(\Delta\varphi)A_c B_{m'}\sin(2\pi(f_{m'})t)$$

The first term is the desired signal and the rest are interference due to the phase imbalance ($\Delta\varphi$). Equations (15) and (9) are identical except for $B_{m'}$. The image rejection is given by Equations (16) and (17).

$$\frac{(1-\cos(\Delta\varphi))^2 + \sin^2(\Delta\varphi)}{(1+\cos(\Delta\varphi))^2}\left(\frac{B_{m'}}{A_m}\right) \approx \frac{\sin^2(\Delta\varphi)}{4}\left(\frac{B_{m'}}{A_m}\right)^2 \quad (16)$$

$$\frac{\sin^2(\Delta\varphi)}{(1+\cos(\Delta\varphi))^2} \approx \frac{\sin^2(\Delta\varphi)}{4} \quad (17)$$

Equation (16) represents the image cancelling and Equation (17) represents in-band interference.

The phase imbalance creates in-band interference in addition to generating image signal even though there is no image signal. There are four terms in the output of demodulator. The in-band interference is $$\frac{1}{2}\sin(\Delta\varphi)A_c A_m \sin(2\pi f_m t),$$

which cannot be suppressed by filtering, while the image signals can be suppressed further by filtering (i.e. $B_{m'} \to 0$). This can also be seen from Equations (16) and (17) for receiver as well as from Equations (10) and (11) for transmitter. The digital IF block can suppress the image signal, but cannot reduce the in-band interference due to the phase imbalance ($\Delta\varphi$). Thus, it is necessary to reduce the phase imbalance of an analog quadrature modulator and demodulator to acceptable level. However, $\Delta\varphi$ can be measured as part of digital signal processing, and then counter-measured (thus cancelling the phase imbalance further).

The image can be suppressed further by filtering without impacting the signal itself. LO leakage can be filtered or DC cancelled (filtered) at baseband again without impacting the signal itself, and thus easily done. This contrasts to direct conversion where DC filtering should be done with care since it is part of the signal.

Figure 29:
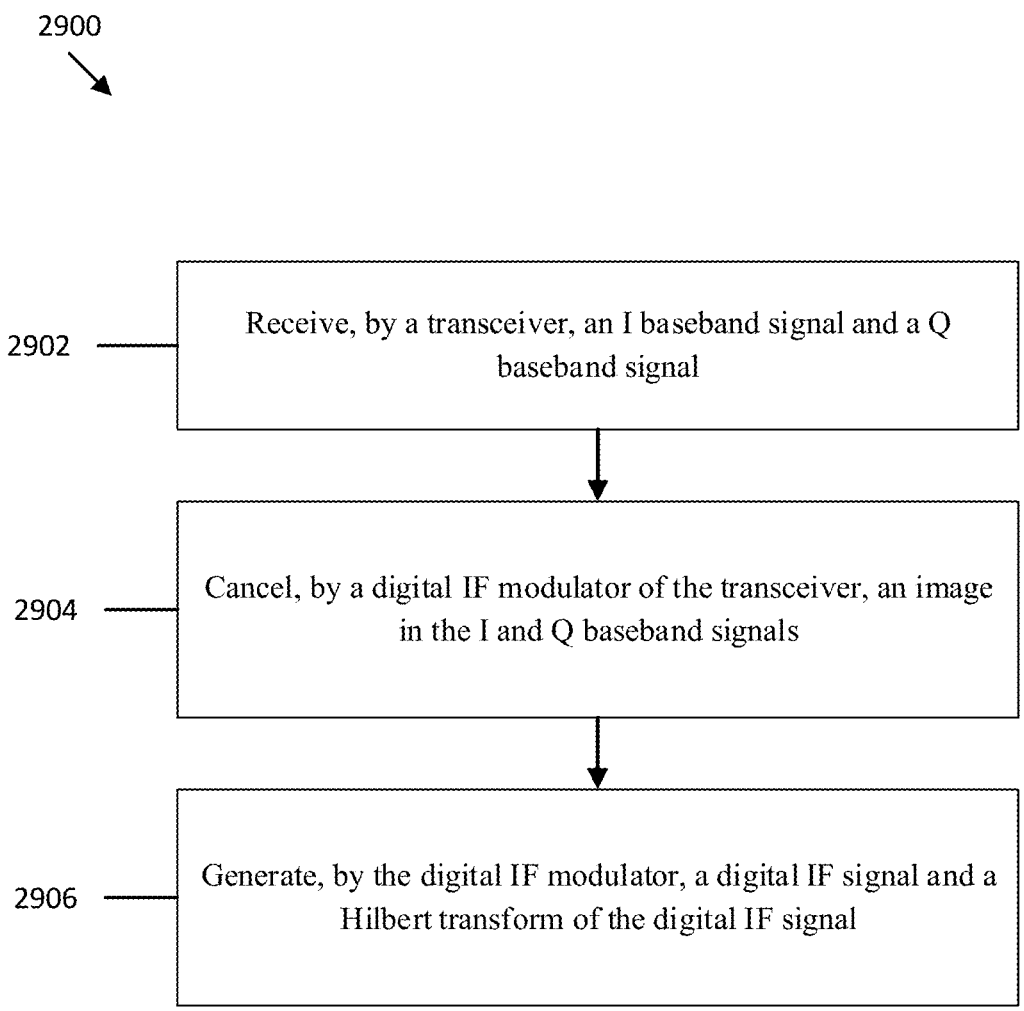
FIG. 29 illustrates a flowchart for a method of image cancelling, according to an embodiment.

FIG. 29 illustrates a flowchart 2900 for a method of image cancelling, according to an embodiment. At 2902, an apparatus receives, by a transceiver, an I baseband signal and a Q baseband signal. At 290, the apparatus cancels, by a digital IF modulator of the transceiver, an image in the I and Q baseband signals. At 2906, the apparatus generates, by the digital IF modulator, a digital IF signal and a Hilbert transform of the digital IF signal.

Figure 30:
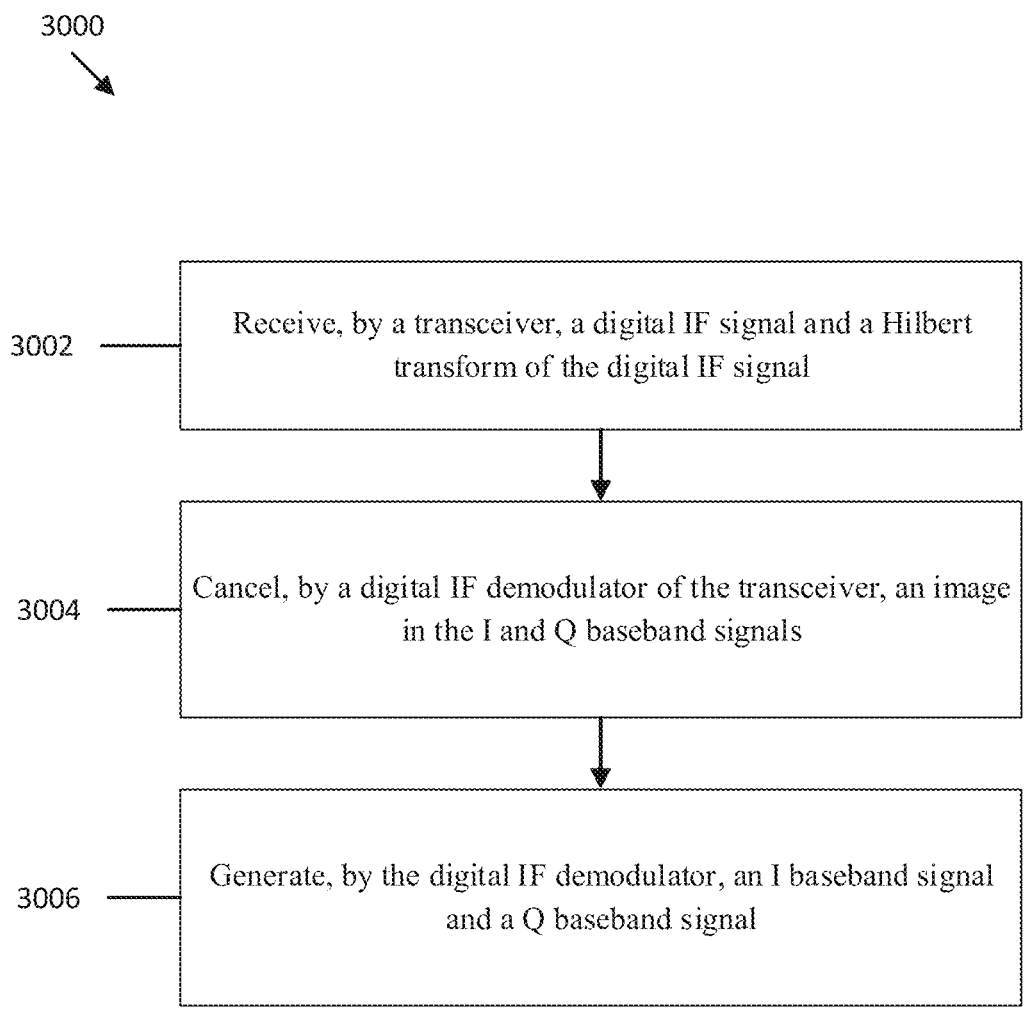
FIG. 30 illustrates a flowchart for a method of image cancelling, according to an embodiment.

FIG. 30 illustrates a flowchart 3000 for a method of image cancelling, according to an embodiment. At 3002, an apparatus receives, by a transceiver, a digital IF signal and a Hilbert transform of the digital IF signal. At 3004, the apparatus cancels, by a digital IF demodulator of the transceiver, an image in the digital IF signal and a Hilbert transform of the digital IF signal. At 3006, the apparatus generates, by the digital IF demodulator, an I baseband signal and a Q baseband signal.

Figure 31:
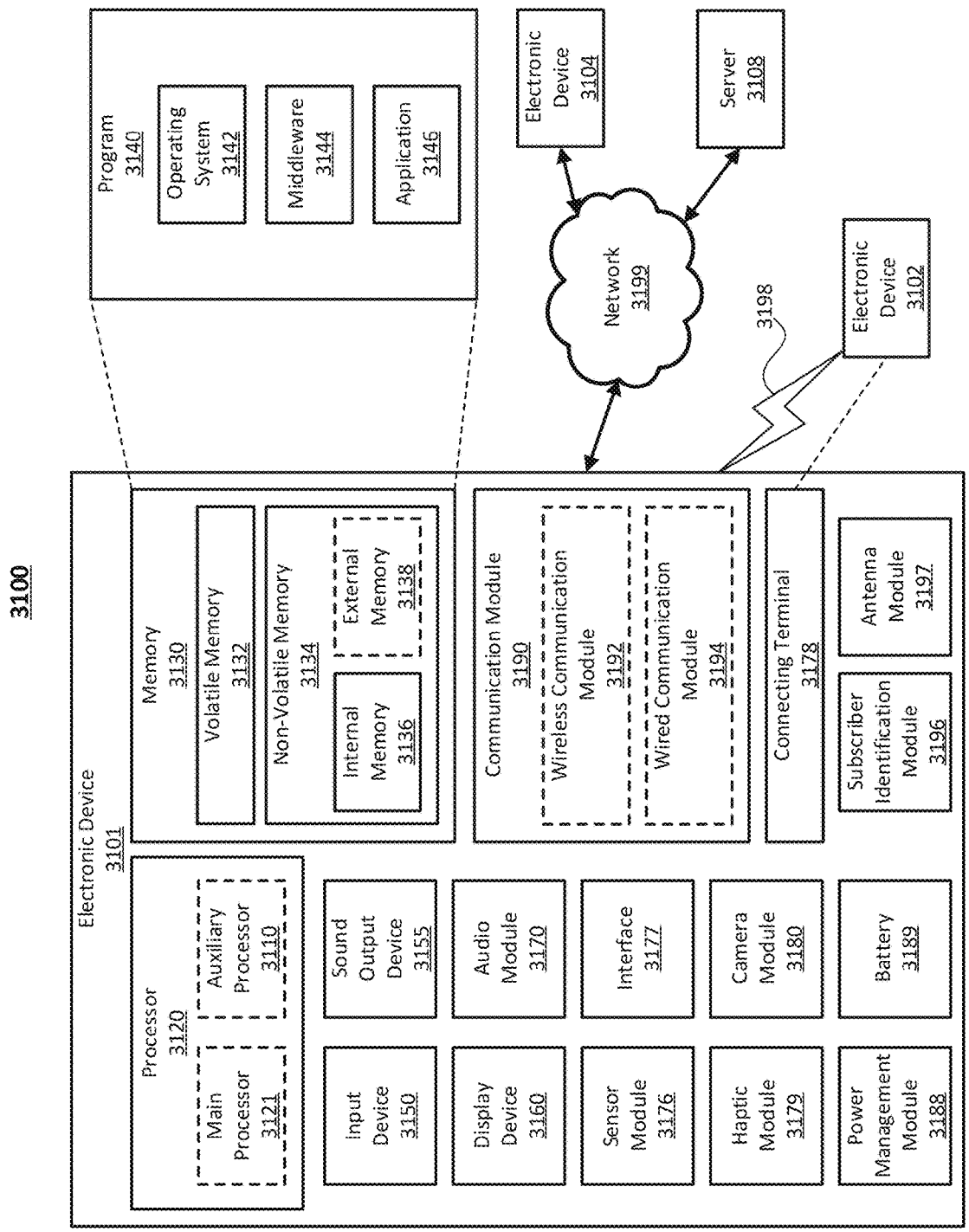
FIG. 31 illustrates a block diagram of an electronic device in a network environment, according to one embodiment.

FIG. 31 illustrates a block diagram of an electronic device 3101 in a network environment 3100, according to one embodiment. Referring to FIG. 31, the electronic device 3101 in the network environment 3100 may communicate with an electronic device 3102 via a first network 3198 (e.g., a short-range wireless communication network), or an electronic device 3104 or a server 3108 via a second network 3199 (e.g., a long-range wireless communication network). The electronic device 3101 may communicate with the electronic device 3104 via the server 3108. The electronic device 3101 may include a processor 3120, a memory 3130, an input device 3150, a sound output device 3155, a display device 3160, an audio module 3170, a sensor module 3176, an interface 3177, a haptic module 3179, a camera module 3180, a power management module 3188, a battery 3189, a communication module 3190, a subscriber identification module (SIM) 3196, or an antenna module 3197. In one embodiment, at least one (e.g., the display device 3160 or the camera module 3180) of the components may be omitted from the electronic device 3101, or one or more other components may be added to the electronic device 3101. In one embodiment, some of the components may be implemented as a single integrated circuit (IC). For example, the sensor module 3176 (e.g., a fingerprint sensor, an iris sensor, or an illuminance sensor) may be embedded in the display device 3160 (e.g., a display).

The processor 3120 may execute, for example, software (e.g., a program 3140) to control at least one other component (e.g., a hardware or a software component) of the electronic device 3101 coupled with the processor 3120, and may perform various data processing or computations. As at least part of the data processing or computations, the processor 3120 may load a command or data received from another component (e.g., the sensor module 3176 or the communication module 3190) in volatile memory 3132, process the command or the data stored in the volatile memory 3132, and store resulting data in non-volatile memory 3134. The processor 3120 may include a main processor 3121 (e.g., a central processing unit (CPU) or an application processor (AP)), and an auxiliary processor 3123 (e.g., a graphics processing unit (GPU), an image signal processor (ISP), a sensor hub processor, or a communication processor (CP)) that is operable independently from, or in conjunction with, the main processor 3121. Additionally or alternatively, the auxiliary processor 3123 may be adapted to consume less power than the main processor 3121, or execute a particular function. The auxiliary processor 3123 may be implemented as being separate from, or a part of, the main processor 3121.

The auxiliary processor 3123 may control at least some of the functions or states related to at least one component (e.g., the display device 3160, the sensor module 3176, or the communication module 3190) among the components of the electronic device 3101, instead of the main processor 3121 while the main processor 3121 is in an inactive (e.g., sleep) state, or together with the main processor 3121 while the main processor 3121 is in an active state (e.g., executing an application). According to one embodiment, the auxiliary processor 3123 (e.g., an image signal processor or a communication processor) may be implemented as part of another component (e.g., the camera module 3180 or the communication module 3190) functionally related to the auxiliary processor 3123.

The memory 3130 may store various data used by at least one component (e.g., the processor 3120 or the sensor module 3176) of the electronic device 3101. The various data may include, for example, software (e.g., the program 3140) and input data or output data for a command related thereto. The memory 3130 may include the volatile memory 3132 or the non-volatile memory 3134.

The program 3140 may be stored in the memory 3130 as software, and may include, for example, an operating system (OS) 3142, middleware 3144, or an application 3146.

The input device 3150 may receive a command or data to be used by other component (e.g., the processor 3120) of the electronic device 3101, from the outside (e.g., a user) of the electronic device 3101. The input device 3150 may include, for example, a microphone, a mouse, or a keyboard.

The sound output device 3155 may output sound signals to the outside of the electronic device 3101. The sound output device 3155 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 3160 may visually provide information to the outside (e.g., a user) of the electronic device 3101. The display device 3160 may include, for example, a display, a hologram device, or a projector and control circuitry to control a corresponding one of the display, hologram device, and projector. According to one embodiment, the display device 3160 may include touch circuitry adapted to detect a touch, or sensor circuitry (e.g., a pressure sensor) adapted to measure the intensity of force incurred by the touch.

The audio module 3170 may convert a sound into an electrical signal and vice versa. According to one embodiment, the audio module 3170 may obtain the sound via the input device 3150, or output the sound via the sound output device 3155 or a headphone of an external electronic device 3102 directly (e.g., wired) or wirelessly coupled with the electronic device 3101.

The sensor module 3176 may detect an operational state (e.g., power or temperature) of the electronic device 3101 or an environmental state (e.g., a state of a user) external to the electronic device 3101, and then generate an electrical signal or data value corresponding to the detected state. The sensor module 3176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3177 may support one or more specified protocols to be used for the electronic device 3101 to be coupled with the external electronic device 3102 directly (e.g., wired) or wirelessly. According to one embodiment, the interface 3177 may include, for example, a high definition multimedia interface (HDMI), a universal serial bus (USB) interface, a secure digital (SD) card interface, or an audio interface.

A connecting terminal 3178 may include a connector via which the electronic device 3101 may be physically connected with the external electronic device 3102. According to one embodiment, the connecting terminal 3178 may include, for example, an HDMI connector, a USB connector, an SD card connector, or an audio connector (e.g., a headphone connector).

The haptic module 3179 may convert an electrical signal into a mechanical stimulus (e.g., a vibration or a movement) or an electrical stimulus which may be recognized by a user via tactile sensation or kinesthetic sensation. According to one embodiment, the haptic module 3179 may include, for example, a motor, a piezoelectric element, or an electrical stimulator.

The camera module 3180 may capture a still image or moving images. According to one embodiment, the camera module 3180 may include one or more lenses, image sensors, image signal processors, or flashes.

The power management module 3188 may manage power supplied to the electronic device 3101. The power management module 3188 may be implemented as at least part of, for example, a power management integrated circuit (PMIC).

The battery 3189 may supply power to at least one component of the electronic device 3101. According to one embodiment, the battery 3189 may include, for example, a primary cell which is not rechargeable, a secondary cell which is rechargeable, or a fuel cell.

The communication module 3190 may support establishing a direct (e.g., wired) communication channel or a wireless communication channel between the electronic device 3101 and the external electronic device (e.g., the electronic device 3102, the electronic device 3104, or the server 3108) and performing communication via the established communication channel. The communication module 3190 may include one or more communication processors that are operable independently from the processor 3120 (e.g., the AP) and supports a direct (e.g., wired) communication or a wireless communication. According to one embodiment, the communication module 3190 may include a wireless communication module 3192 (e.g., a cellular communication module, a short-range wireless communication module, or a global navigation satellite system (GNSS) communication module) or a wired communication module 3194 (e.g., a local area network (LAN) communication module or a power line communication (PLC) module). A corresponding one of these communication modules may communicate with the external electronic device via the first network 3198 (e.g., a short-range communication network, such as Bluetooth™, wireless-fidelity (Wi-Fi) direct, or a standard of the Infrared Data Association (IrDA)) or the second network 3199 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 3192 may identify and authenticate the electronic device 3101 in a communication network, such as the first network 3198 or the second network 3199, using subscriber information (e.g., international mobile subscriber identity (IMSI)) stored in the subscriber identification module 3196.

The antenna module 3197 may transmit or receive a signal or power to or from the outside (e.g., the external electronic device) of the electronic device 3101. According to one embodiment, the antenna module 3197 may include one or more antennas, and, therefrom, at least one antenna appropriate for a communication scheme used in the communication network, such as the first network 3198 or the second network 3199, may be selected, for example, by the communication module 3190 (e.g., the wireless communication module 3192). The signal or the power may then be transmitted or received between the communication module 3190 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 3101 and the external electronic device 3104 via the server 3108 coupled with the second network 3199. Each of the electronic devices 3102 and 3104 may be a device of a same type as, or a different type, from the electronic device 3101. All or some of operations to be executed at the electronic device 3101 may be executed at one or more of the external electronic devices 3102, 3104, or 3108. For example, if the electronic device 3101 should perform a function or a service automatically, or in response to a request from a user or another device, the electronic device 3101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3101. The electronic device 3101 may provide the outcome, with or without further processing of the outcome, as at least part of a reply to the request. To that end, a cloud computing, distributed computing, or client-server computing technology may be used, for example.

One embodiment may be implemented as software (e.g., the program 3140), including one or more instructions that are stored in a storage medium (e.g., internal memory 3136 or external memory 3138) that is readable by a machine (e.g., the electronic device 3101). For example, a processor of the electronic device 3101 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
    receiving, by a transceiver including a digital intermediate frequency (IF) modulator, an I baseband signal and a Q baseband signal;
    cancelling, by the digital IF modulator, an image in the I and Q baseband signals around the direct current (DC) value; and
    generating, by the digital IF modulator, a digital IF signal and a Hilbert transform of the digital IF signal.

2. The method of claim 1, wherein cancelling the image in the I and Q baseband signals includes adding a digital IF with an in-phase and a quadrature phase.

3. The method of claim 2, wherein the I and Q baseband signals are filtered by an interpolator of the digital IF modulator.

4. The method of claim 1, further comprising cancelling, by the digital IF modulator, a main upper sideband signal around double a digital IF carrier frequency.

5. The method of claim 1, further comprising selecting, by the transceiver, a digital IF carrier frequency that is the same as a symbol rate.

6. An apparatus, comprising:
    a transceiver including a digital intermediate frequency (IF) modulator;
    a memory; and
    a processor configured to:
        receive, by the transceiver, an I baseband signal and a Q baseband signal;

cancel, by the digital IF modulator, an image in the I and Q baseband signals around the direct current (DC) value; and generate, by the digital IF modulator, a digital IF signal and a Hilbert transform of the digital IF signal.

7. The apparatus of claim 6, wherein the processor is further configured to cancel the image in the I and Q baseband signals by adding a digital IF with an in-phase and a quadrature phase.

8. The apparatus of claim 7, wherein the digital IF modulator includes an interpolator, and the I and Q baseband signals are filtered by the interpolator.

9. The apparatus of claim 6, wherein the processor is further configured to cancel, by the digital IF modulator, a main upper sideband signal around double a digital IF carrier frequency.

10. The apparatus of claim 6, wherein the processor is further configured to select, by the transceiver, a digital IF carrier frequency that is the same as a symbol rate.

11. A method, comprising:

receiving, by a transceiver including a digital intermediate frequency (IF) demodulator, a digital IF signal and a Hilbert transform of the digital IF signal;

cancelling, by the digital IF demodulator, an image in the a digital IF signal and a Hilbert transform of the digital IF signal around the direct current (DC) value; and generating, by the digital IF demodulator, an I baseband signal and a Q baseband signal.

12. The method of claim 11, wherein a main upper sideband signal is cancelled around double a digital IF carrier frequency.

13. The method of claim 12, wherein the decimator includes a finite impulse response (FIR) filter.

14. The method of claim 11, further comprising selecting, by the transceiver, a digital IF carrier frequency that is the same as a symbol rate.

15. An apparatus, comprising:

a transceiver including a digital intermediate frequency (IF) modulator;

a memory; and a processor configured to:

receive, by a transceiver including a digital IF demodulator, a digital IF signal and a Hilbert transform of the digital IF signal;

cancel, by the digital IF demodulator, an image in the a digital IF signal and a Hilbert transform of the digital IF signal;

cancel, by the digital IF demodulator, a main upper sideband signal around double a digital IF carrier frequency; and generate, by the digital IF demodulator, an I baseband signal and a Q baseband signal.

16. The apparatus of claim 15, wherein the image is cancelled around the direct current (DC) value.

17. The apparatus of claim 15, wherein the decimator includes a finite impulse response (FIR) filter.

18. The apparatus of claim 15, wherein the processor is further configured to select, by the transceiver, a digital IF carrier frequency that is the same as a symbol rate.

* * * * *